US012715643B2

(12) United States Patent
Malhotra et al.

(10) Patent No.: US 12,715,643 B2
(45) Date of Patent: Aug. 25, 2026

(54) METHOD AND SYSTEM FOR PRODUCING STERILE SOLUTION FILLED CONTAINERS

(71) Applicants: BAXTER INTERNATIONAL INC., Deerfield, IL (US); BAXTER HEALTHCARE SA, Glattpark (CH)

(72) Inventors: Atul Malhotra, Vernon Hills, IL (US); Gianni Di Stefani, Ath (BE)

(73) Assignees: BAXTER INTERNATIONAL INC., Deerfield, IL (US); BAXTER HEALTHCARE SA, Glattpark (CH)

(*) Notice: Subject to any disclaimer, the term of this patent is extended or adjusted under 35 U.S.C. 154(b) by 0 days.

(21) Appl. No.: 19/225,172

(22) Filed: Jun. 2, 2025

(65) Prior Publication Data

US 2025/0289607 A1 Sep. 18, 2025

Related U.S. Application Data

(63) Continuation of application No. 18/265,758, filed as application No. PCT/US2021/064494 on Dec. 21, 2021, now Pat. No. 12,391,421.

(Continued)

(51) Int. Cl.

| | |
|---|---|
| ***B65B 3/00*** | (2006.01) |
| ***B65B 3/04*** | (2006.01) |
| ***B65B 3/12*** | (2006.01) |
| ***B65B 37/06*** | (2006.01) |
| ***B65B 39/00*** | (2006.01) |

(Continued)

(52) U.S. Cl.

CPC .............. *B65B 57/04* (2013.01); *B65B 3/003* (2013.01); *B65B 3/045* (2013.01); *B65B 3/12* (2013.01); *B65B 37/06* (2013.01); *B65B 39/001* (2013.01); *B65B 51/142* (2013.01); *B65B 51/225* (2013.01); *B65B 55/12* (2013.01);

(Continued)

(58) Field of Classification Search

CPC ........... B65B 3/00; B65B 3/003; B65B 3/006; B65B 3/04; B65B 3/12; B65B 3/16–18; B65B 37/00

See application file for complete search history.

(56) References Cited

U.S. PATENT DOCUMENTS

| | | |
|---|---|---|
| 3,791,424 A | 2/1974 | Strople et al. |
| 4,208,852 A | 6/1980 | Pioch |

(Continued)

FOREIGN PATENT DOCUMENTS

| | | |
|---|---|---|
| JP | H0717529 A | 1/1995 |
| JP | H10238471 A | 9/1998 |

(Continued)

OTHER PUBLICATIONS

Japanese Patent Application No. 2023-535835, Office Action, mailed Nov. 18, 2025.

(Continued)

*Primary Examiner* — Gloria R Weeks
(74) *Attorney, Agent, or Firm* — K&L Gates LLP

(57) ABSTRACT

A cartridge assembly for a filling machine includes a plurality of containers. Each container includes a volume and a stem connected to the volume. A connection line grid is in fluid communication with each stem of the plurality of containers. The connection line grid includes a first row connected to one or more containers of the plurality of containers and a second row connected to one or more containers of the plurality of containers. A filter assembly is coupled to the connection line grid.

17 Claims, 31 Drawing Sheets

Related U.S. Application Data

(60) Provisional application No. 63/130,979, filed on Dec. 28, 2020.

(51) Int. Cl.

| | |
|---|---|
| ***B65B 51/14*** | (2006.01) |
| ***B65B 51/22*** | (2006.01) |
| ***B65B 55/12*** | (2006.01) |
| ***B65B 57/04*** | (2006.01) |
| ***B65B 61/06*** | (2006.01) |
| ***B65B 65/00*** | (2006.01) |
| *A61J 1/10* | (2006.01) |

(52) U.S. Cl.
CPC ............ *B65B 61/06* (2013.01); *B65B 65/006* (2013.01); *A61J 1/10* (2013.01)

(56) References Cited

U.S. PATENT DOCUMENTS

| | | | |
|---|---|---|---|
| 6,840,108 | B2 | 1/2005 | Stauffer |
| 7,322,170 | B2 | 1/2008 | Tomalesky et al. |
| 7,484,345 | B2 | 2/2009 | Woods et al. |
| 8,356,461 | B2 | 1/2013 | Cedrone |
| 8,621,824 | B2 | 1/2014 | Mielnik et al. |
| 9,278,769 | B2 | 3/2016 | Janssens et al. |
| 10,273,025 | B2 | 4/2019 | Py |
| 11,383,188 | B2 | 7/2022 | Walker et al. |
| 2007/0271997 | A1 | 11/2007 | O'Brien |
| 2008/0060459 | A1 | 3/2008 | Rich |
| 2010/0236340 | A1 | 9/2010 | Lee et al. |
| 2013/0312370 | A1 | 11/2013 | Mueller et al. |
| 2016/0199257 | A1 | 7/2016 | Husnu et al. |
| 2019/0048303 | A1 | 2/2019 | Maggiore |
| 2021/0309398 | A1 | 10/2021 | Kircher et al. |

FOREIGN PATENT DOCUMENTS

| | | | |
|---|---|---|---|
| JP | H11102056 | A | 4/1999 |
| JP | 2006-527140 | A | 11/2006 |
| JP | 2009519440 | A | 5/2009 |
| JP | 2011220901 | A | 11/2011 |
| JP | 2019-137468 | A | 8/2019 |
| JP | 2019167138 | A | 10/2019 |
| JP | 2020-199497 | A | 12/2020 |
| WO | WO-2004108533 | A1 | 12/2004 |
| WO | WO-2005030586 | A1 | 4/2005 |
| WO | WO-2012092394 | A1 | 7/2012 |
| WO | WO-2014108852 | A1 | 7/2014 |
| WO | WO-2017127632 | A1 | 7/2017 |
| WO | WO-2019029886 | A1 | 2/2019 |

OTHER PUBLICATIONS

International Search Report and Written Opinion issued in International Application No. PCT/US2021/064494, dated Jul. 12, 2022.

International Search Report and Written Opinion issued in International Patent Application No. PCT/US2021/064487, dated Aug. 4, 2022.

Japanese Patent Application No. 2023-535836, Notice of Reasons for Refusal, dated May 28, 2025.

METHOD AND SYSTEM FOR PRODUCING STERILE SOLUTION FILLED CONTAINERS

CROSS-REFERENCE TO RELATED APPLICATIONS

This application is a continuation of U.S. application Ser. No. 18/265,758, filed Jun. 7, 2023, which is a national phase of International Application No. PCT/US21/64494, filed Dec. 21, 2021, which claims the benefit of U.S. Provisional Application No. 63/130,979, filed Dec. 28, 2020, the entireties of which are expressly incorporated by reference herein.

FIELD OF DISCLOSURE

The present disclosure relates to sterile solution-filled containers, and more particularly, to a method, system, and machine for producing sterile solution-filled containers.

BACKGROUND

Conventional methods for manufacturing bags of sterile solution include filling bags in a clean environment with a solution, sealing the filled bag of solution, and then sterilizing the fluid and bags in a sterilizing autoclave. This can be referred to as terminal sterilization. Another conventional method is to sterile-filter a solution and to fill and seal sterile bags in an extremely high-quality environment designed and controlled to prevent contamination of the solution during the filling process and to seal the filled bag. This can be referred to as an aseptic filling process.

The terminal sterilization process generally requires one or more autoclaves to produce the sterilizing heat and steam needed to suitably sterilize the bag of solution for medical use. These autoclaves generally are not economical unless they can produce large batches of terminally sterilized bags. Typically, centralized manufacturing facilities can afford the capital expenditure needed and space requirements to produce and ship sterile solution-filled bags. In addition to these costs, the application of terminal sterilization processes may degrade the solution formulation contained in the bags, thereby leading to incompatible or unstable formulations. Moreover, terminal sterilization does not eliminate non-viable contamination.

The aseptic manufacturing process must occur in a sterile working environment, and requires expensive equipment, stringent procedures and extensive monitoring to ensure that solution product bags meet certain environmental and manufacturing regulatory standards. Sterilizing a working environment, by itself, can be costly and time consuming. Additional precautions apply for technicians involved in the filling process to ensure the production of safe and sterile products. Even with these safeguards, unless it can be verified that the solution entering the bag is sterile, there is a risk that contaminants may have inadvertently been introduced into the solution during filling/sealing. Once introduced, unless the solution later passes through a viable sterilizing filter, the contaminants will remain in the solution.

SUMMARY

In accordance with a first exemplary aspect, a method for producing sterile solution-filled containers may include positioning a cartridge onto a filling machine. The cartridge may include a plurality of containers, a filter assembly, a connection line in fluid communication with the filter assembly, and a reservoir coupled to the connection line, disposed upstream from the plurality of containers, and disposed downstream from the filter assembly. Each of the plurality of containers may include a volume and a stem having a first end in fluid communication with the volume and a second end in fluid communication with the connection line. The method may include coupling the cartridge to a feed line in fluid communication with a fluid source, and activating a pump coupled to the feed line. The method may include at least partially filling one or more of the volumes associated with the plurality of containers by pumping fluid through the feed line, the filter assembly, the reservoir, and the connection line, thereby creating one or more at least partially filled containers. After filling, the method may include sealing the stem of each of the at least partially filled containers at a location between the connection line and the volume of the at least partially filled containers, thereby creating one or more at least partially filled and sealed containers. Finally, the method may include separating each of the at least partially filled and sealed containers from the connection line while maintaining at least a portion of the seal on the stem.

In accordance with a second exemplary aspect, a cartridge assembly for a filling machine may include a plurality of containers. Each container may include a volume and a stem connected to the volume. A connection line grid may be in fluid communication with each stem of the plurality of containers. The connection line grid may include a first row connected to one or more containers of the plurality of containers and a second row connected to one or more containers of the plurality of containers. A filter assembly may be coupled to the connection line grid.

In accordance with a third exemplary aspect, a machine for producing a plurality of solution-filled containers may include a seal and cut assembly including a sealer, a cutter, and a carriage carrying the sealer and the cutter. The seal and cut assembly may be movable in a lateral direction and in a longitudinal direction. A bracket may receive a cartridge of containers. The machine may include a first group of pinch valves that include a first column and a second column spaced from the first column. A second group of pinch valves may be disposed between the first column and the second column. The second group of pinch valves may be movable in the longitudinal direction.

In further accordance with any one or more of the foregoing first, second, or third exemplary aspects, a method, system, and machine for producing sterile solution containers may further include any one or more of the following preferred forms.

In a preferred form, which may be combined with any other form, or portion thereof, the method may include at least partially filling the reservoir with a solution from the mix tank before at least partially filling one or more volumes.

In a preferred form, which may be combined with any other form, or portion thereof, the method may include activating a second pump coupled to the connection line.

In a preferred form, which may be combined with any other form, or portion thereof, the second pump may be disposed downstream from the reservoir and upstream from the plurality of containers.

In a preferred form, which may be combined with any other form, or portion thereof, the method may include reversing the second pump after separating each of the at least partially filled and sealed containers from the connection line.

In a preferred form, which may be combined with any other form, or portion thereof, at least partially filling one or more of the volumes may include filling a first row of the connection line with a solution.

In a preferred form, which may be combined with any other form, or portion thereof, the first row may include one or more containers.

In a preferred form, which may be combined with any other form, or portion thereof, filling a first bag of the first row may include releasing a first valve coupled to the connection line of the first row.

In a preferred form, which may be combined with any other form, or portion thereof, filling the first bag of the first row may include releasing a second valve coupled to a stem of the first bag.

In a preferred form, which may be combined with any other form, or portion thereof, the method may include filling a second bag of the first row after opening a third valve coupled to a stem of the second bag.

In a preferred form, which may be combined with any other form, or portion thereof, the method may include closing the second valve coupled to the stem of the first bag.

In a preferred form, which may be combined with any other form, or portion thereof, the method may include moving a seal and cut assembly in a lateral direction from the first bag of the first row to the second bag of the first row.

In a preferred form, which may be combined with any other form, or portion thereof, at least partially filling one or more of the volumes may include filling a second row of the connection line with a solution after separating each of the at least partially filled and sealed containers from the first row of the connection line.

In a preferred form, which may be combined with any other form, or portion thereof, the second row may be parallel to the first row and may include one or more containers.

In a preferred form, which may be combined with any other form, or portion thereof, the method may include moving a seal and cut assembly in a longitudinal direction from the first row toward the second row of the connection line before filling a second row of the connection line.

In a preferred form, which may be combined with any other form, or portion thereof, the method may include purging air from the feed line before at least partially filling the one or more volumes.

In a preferred form, which may be combined with any other form, or portion thereof, the method may include purging air from the connection line of the cartridge before at least partially filling the one or more volumes.

In a preferred form, which may be combined with any other form, or portion thereof, purging air from the connection line may include activating a second pump to deliver air from the connection line to a reservoir disposed above the connection line.

In a preferred form, which may be combined with any other form, or portion thereof, purging air from the connection line may include purging a first row of the connection line by opening a first row supply valve and opening a first row return valve.

In a preferred form, which may be combined with any other form, or portion thereof, the first row may include a first end, a second end, and one or more containers disposed between the first and second ends.

In a preferred form, which may be combined with any other form, or portion thereof, the first end may be coupled to the first row supply valve and the second end may be coupled to the first row return valve.

In a preferred form, which may be combined with any other form, or portion thereof, the method may include decoupling the cartridge from the filling machine and coupling a different cartridge to the filling machine.

In a preferred form, which may be combined with any other form, or portion thereof, the different cartridge may include a plurality of containers, a filter assembly, and a connection line in fluid communication with the filter assembly.

In a preferred form, which may be combined with any other form, or portion thereof, each of the plurality of containers of the different cartridge may include a volume and a stem having a first end in fluid communication with the volume and a second end in fluid communication with the connection line.

In a preferred form, which may be combined with any other form, or portion thereof, sealing the stem may include capturing the stem with a sealing device and collecting sealing sensor data associated with a seal of the stem.

In a preferred form, which may be combined with any other form, or portion thereof, the at least one sensor is associated with a sealing energy source, such as an RF generator.

In a preferred form, which may be combined with any other form, or portion thereof, sealing the stem may include analyzing, by one or more processors of a controller, the sensor data associated with the seal.

In a preferred form, which may be combined with any other form, or portion thereof, sealing the stem may include identifying, by one or more processors, based on an analysis of the sensor data, a status or condition associated with the seal.

In a preferred form, which may be combined with any other form, or portion thereof, the method may include accepting the seal if an average weld power, analyzed by the one or more processors, is within a stored acceptable weld power range.

In a preferred form, which may be combined with any other form, or portion thereof, the method may include rejecting the seal if an average weld power, analyzed by the one or more processors, is less than a lower limit of a stored acceptable weld power range.

In a preferred form, which may be combined with any other form, or portion thereof, the method may include rejecting the seal if a direct short is detected in the sealing device by the one or more processors.

In a preferred form, which may be combined with any other form, or portion thereof, the method may include rejecting the seal if an average weld power, analyzed by the one or more processors, is greater than an upper limit of a stored acceptable weld power range or less than a lower limit of the stored acceptable power range.

In a preferred form, which may be combined with any other form, or portion thereof, the method may include re-sealing the stem.

In a preferred form, which may be combined with any other form, or portion thereof, the filter assembly may include a first filter and a second filter arranged in series.

In a preferred form, which may be combined with any other form, or portion thereof, a reservoir may be coupled to the connection line grid.

In a preferred form, which may be combined with any other form, or portion thereof, the reservoir may be disposed upstream from the plurality of containers.

In a preferred form, which may be combined with any other form, or portion thereof, the reservoir may be disposed downstream from the filter assembly.

In a preferred form, which may be combined with any other form, or portion thereof, the reservoir may include a volume, an inlet port, and an outlet port.

In a preferred form, which may be combined with any other form, or portion thereof, the reservoir may be disposed above, with respect to gravity, the connection line grid.

In a preferred form, which may be combined with any other form, or portion thereof, the connection line grid may include a network of interconnected tubing defining a supply manifold, a return manifold, the first row, and the second row.

In a preferred form, which may be combined with any other form, or portion thereof, the first row and the second row may extend between the supply manifold and the return manifold.

In a preferred form, which may be combined with any other form, or portion thereof, the supply manifold of the connection line grid may be coupled to the outlet port of the reservoir.

In a preferred form, which may be combined with any other form, or portion thereof, the return manifold may be coupled to the inlet port of the reservoir.

In a preferred form, which may be combined with any other form, or portion thereof, the network of interconnected tubing may include at least one rigid portion connected to at least one flexible portion.

In a preferred form, which may be combined with any other form, or portion thereof, each of the first and second rows may include a first end, a second end, and a fill manifold connecting the first and second ends.

In a preferred form, which may be combined with any other form, or portion thereof, the first and second ends may be flexible and the fill manifold may be rigid.

In a preferred form, which may be combined with any other form, or portion thereof, the supply manifold may be coupled to the first end of each of the first and second rows.

In a preferred form, which may be combined with any other form, or portion thereof, the return manifold may be coupled to the second end of each of the first and second rows.

In a preferred form, which may be combined with any other form, or portion thereof, the fill manifold of each of the first and second rows may include one or more ports corresponding to the one or more containers of each of the first and second rows.

In a preferred form, which may be combined with any other form, or portion thereof, each port corresponding to one container may be in fluid communication with one stem.

In a preferred form, which may be combined with any other form, or portion thereof, each row of the first and second rows of the connection line grid may be coupled to at least two of the plurality of containers.

In a preferred form, which may be combined with any other form, or portion thereof, the seal and cut assembly may include at least one sensor and a controller.

In a preferred form, which may be combined with any other form, or portion thereof, the controller may include one or more processors.

In a preferred form, which may be combined with any other form, or portion thereof, the controller may include a memory communicatively coupled to the one or more processors and storing executable instructions that, when executed by the one or more processors, causes the one or more processors to receive data captured by the at least one sensor, analyze the data to identify a status or condition associated with a seal created by the sealer, and send a signal to a controller of the machine to accept or reject the seal.

In a preferred form, which may be combined with any other form, or portion thereof, a conveyor may be disposed below, relative to gravity, the seal and cut assembly.

In a preferred form, which may be combined with any other form, or portion thereof, the conveyor may be movable with the seal and cut assembly.

In a preferred form, which may be combined with any other form, or portion thereof, the bracket for the cartridge may be coupled to a plurality of rails.

In a preferred form, which may be combined with any other form, or portion thereof, the bracket and the plurality of rails may be configured to remove or receive a cartridge of containers.

In a preferred form, which may be combined with any other form, or portion thereof, the one or more containers may be one or more containers.

In a preferred form, which may be combined with any other form, or portion thereof, the one or more containers may be one or more vials.

In a preferred form, which may be combined with any other form, or portion thereof, the one or more containers may be one or more syringes.

In a preferred form, which may be combined with any other form, or portion thereof, positioning a cartridge onto a filling machine may include positioning a cartridge having a plurality of containers as containers, each product bag including a bladder as the volume.

In a preferred form, which may be combined with any other form, or portion thereof, positioning a cartridge onto a filling machine may include positioning a cartridge having a plurality of vials as containers.

In a preferred form, which may be combined with any other form, or portion thereof, positioning a cartridge onto a filling machine may include positioning a cartridge having a plurality of syringes as containers.

In a preferred form, which may be combined with any other form, or portion thereof, the one or more containers may include one or more containers, and wherein the volume is a bladder.

In a preferred form, which may be combined with any other form, or portion thereof, the plurality of containers may include a plurality of containers, and wherein the volume is a bladder.

In a preferred form, which may be combined with any other form, or portion thereof, the plurality of containers may include a plurality of vials.

In a preferred form, which may be combined with any other form, or portion thereof, the plurality of containers may include a plurality of syringes.

DETAILED DESCRIPTION

The present disclosure relates to a flexible filling platform that may be used for sterile filling multiple containers with solution without the need for specialized barrier systems, such as, for example, isolators and closed restrictive access barrier systems (RABS). The disclosed filling platform includes a filling system, a disposable cartridge of containers, and a filling machine to increase filling capacity and efficiency, ensure sterility and safety of the end product, and automate production.

Figure 1:
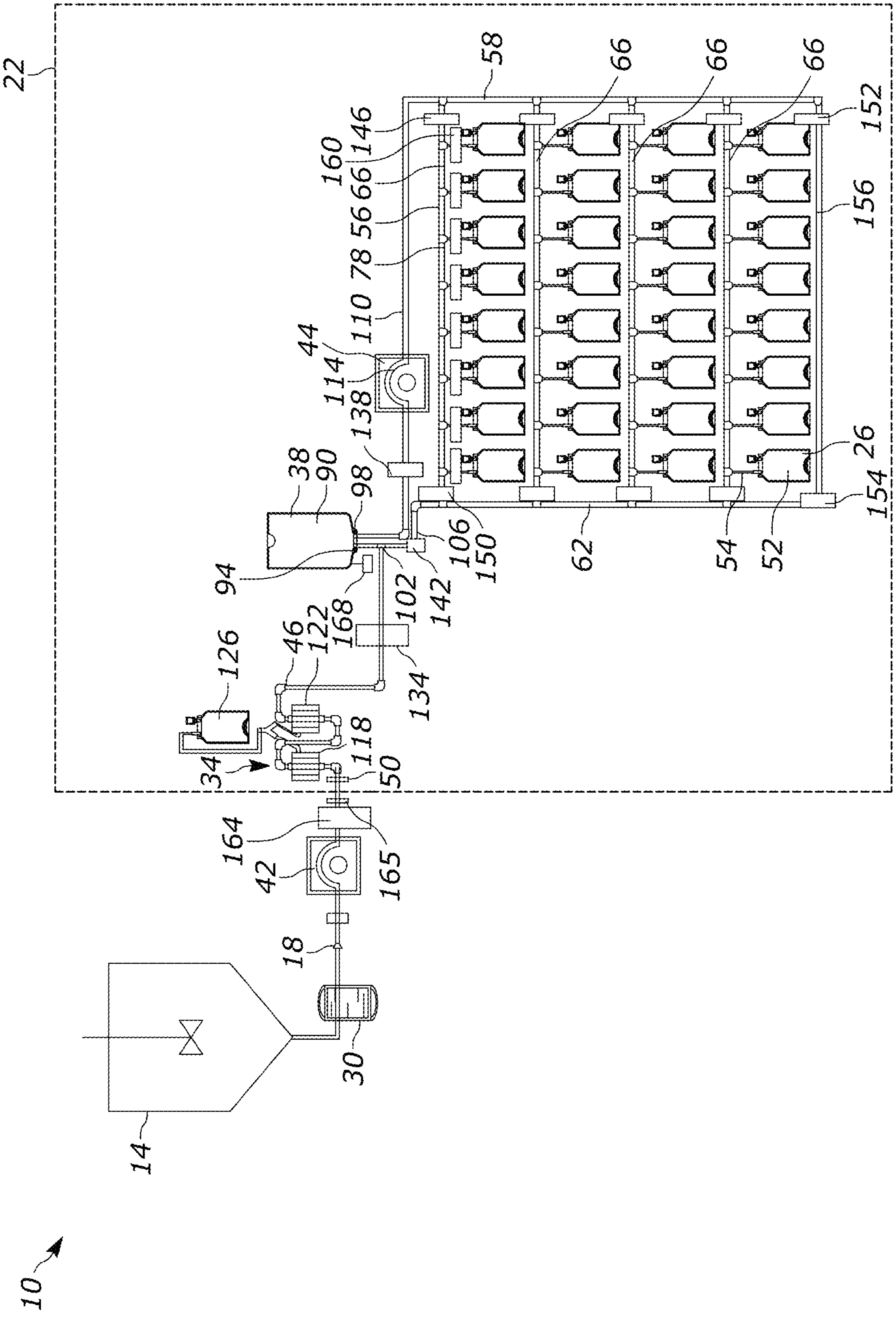
FIG. 1 is a schematic diagram of an exemplary system for producing sterile solution containers in accordance with the teachings of the present disclosure.

In FIG. 1, a schematic diagram of a system 10 for filling a plurality of containers with a sterile solution is illustrated in accordance with the teachings of the present disclosure. The system 10 includes a fluid source, which may be a mix tank 14, a feed line 18, and a cartridge 22. A solution mixed in the mix tank 14 is delivered to a plurality of containers, and in this example product bags 26, of the cartridge 22 by passing the solution through an endotoxin-removing batch filter 30, a filter assembly 34 of the cartridge 22, and reservoir, which may be an intermediate container 38, of the cartridge 22 before the solution is pumped from the reservoir 38 and into each of the plurality of bags 26. In other examples, the fluid source 14 of the system 10 may have in-line mixing in combination or instead of a mix tank. The feed line 18 and a connection line 46 of the cartridge 22 are in fluid communication with each other to permit the flow of the solution from the mix tank 14 and into the connection line 46 to fill the plurality of bags 26 of the cartridge 22. The feed line 18 and the connection line 46 are connected at an aseptic cartridge connector 50. First and second pumps 42, 44 and isolation valves coupled to the feed line 18 and connection line 46 of the cartridge 22 to pump and control, respectively, the flow of solution through the system 10. Specifically, the dual pump configuration separates the pumping operation: the first pump 42 draws fluid from the mix tank 14 for delivery to the cartridge 22, and the second pump 44 accurately pumps fluid within the cartridge 22. In an alternative arrangement, the first pump 42 may also be replaced with a mix tank pressurizing system using pressurized filtered air or nitrogen to transfer solution to the reservoir 38.

Figure 2:
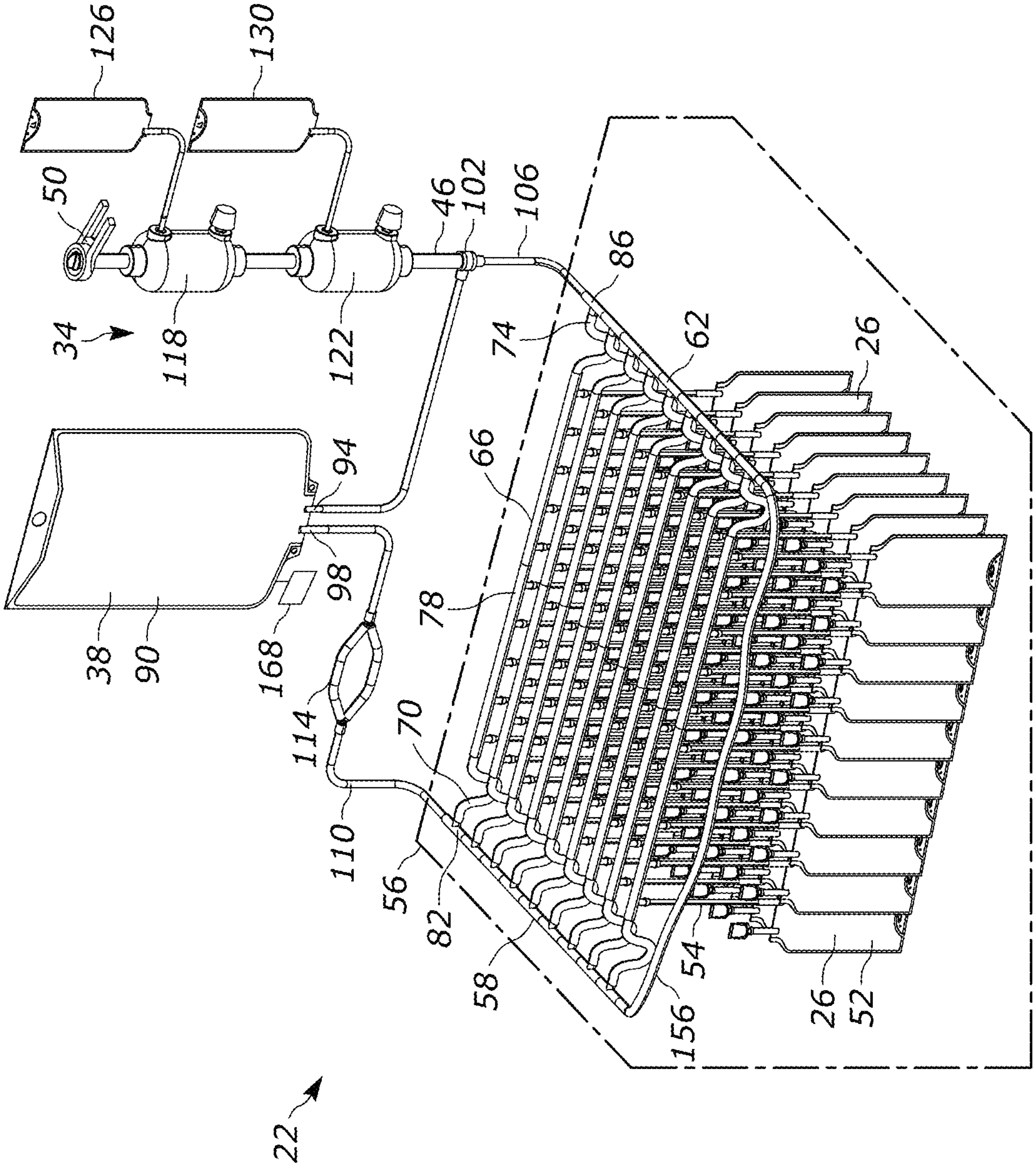
FIG. 2 is a perspective view of a first exemplary cartridge of the system of FIG. 1 assembled in accordance with the teachings of the present disclosure.

FIG. 2 illustrates an exemplary cartridge 22 of the system 10 of FIG. 1. The cartridge 22 includes the plurality of containers 26, the filter assembly 34, the reservoir 38, and the connection line 46. The plurality of containers 26 may be one of a variety of product bags 26, an in a preferred example, each bag 26 is the same size and includes a volume 52 and a stem 54 connected to the volume 52. The connection line 46 is a network of interconnected tubes and includes a solution distribution grid 56 in fluid communication with each stem 54 of the plurality of containers 26. The solution distribution grid 56 includes a supply manifold 58, a return manifold 62, and a plurality of rows 66 connecting the supply manifold 58 and return manifold 62. The connection line 46 includes a plurality of connected rigid portions to reduce lag and to provide structure, and a plurality of flexible portions to allow for fluid isolation at various locations and stages or phases of the filling cycle.

Non-limiting examples of acceptable containers for the plurality of containers 26 of the cartridge 22 are disclosed in U.S. Pat. No. 10,617,603, U.S. Patent Publication No. 2020/0214938, U.S. Patent Publication No. 2020/0222281, U.S. Patent Publication No. 2020/0146932, U.S. Patent Publication No. 2020/0147251, U.S. Patent Publication No. 2020/0146931, and U.S. Patent Publication No. 2020/0147310, the entire contents of each of which are expressly incorporated herein by reference. While the containers 26 are illustrated in the figures as product bags 26 with bladders 52, the containers may include syringes, vials, bottles, or other vessels having bladders, reservoirs, or internal volumes for holding a solution.

Figure 3:
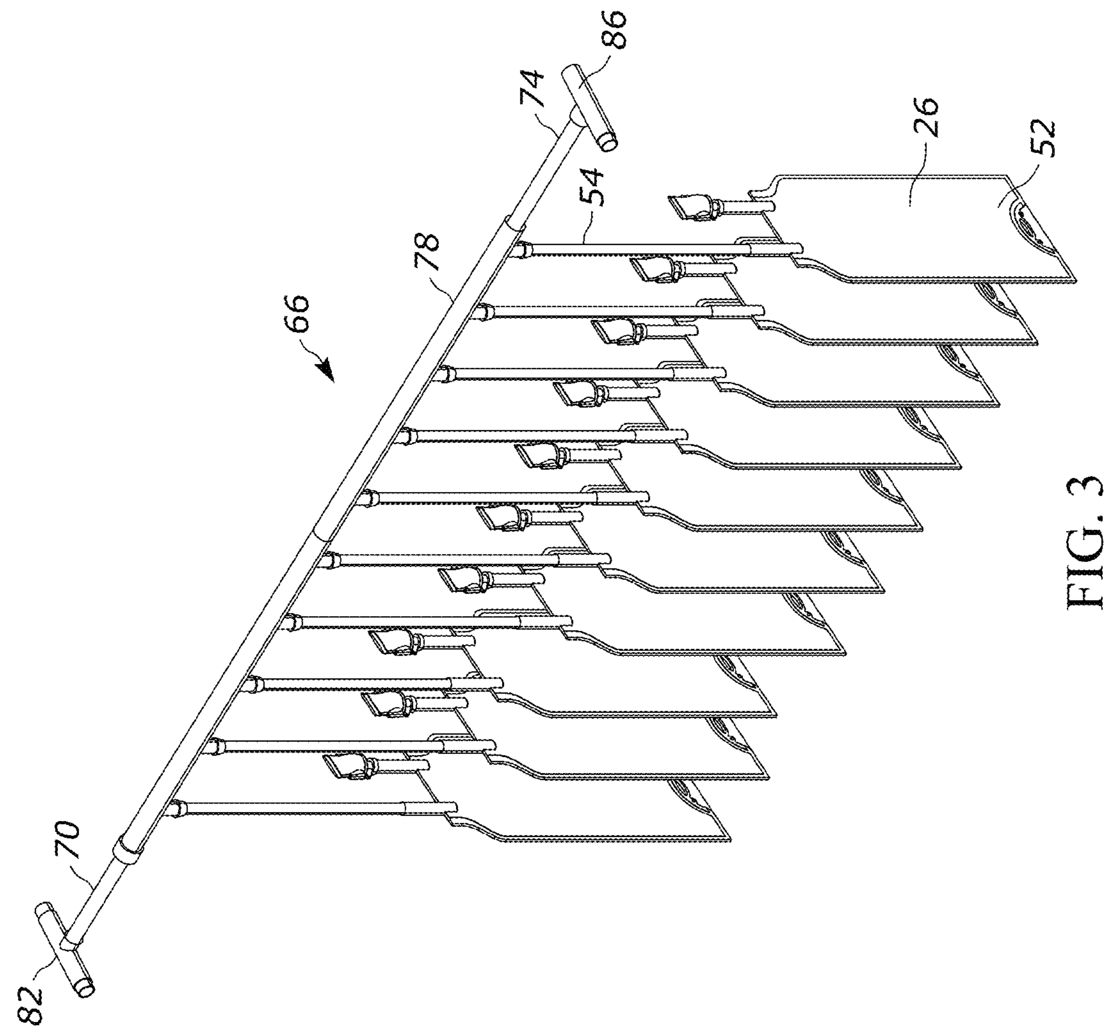
FIG. 3 is a perspective view of an exemplary row isolated from the cartridge of FIG. 2.

An exemplary row 66 of the solution distribution grid 56 of the first exemplary cartridge 22 is shown in more detail in FIG. 3. The row 66 includes a first end 70, a second end 74, a fill manifold 78 connecting the first and second ends 70, 74, and ten product bags 26 in fluid communication with the fill manifold 78. The fill manifold 78 includes a plurality of ports where each port is connected to the stem 54 of each bag 26. The first and second ends 70, 74 of the row 66 are made of flexible tubing, such as, for example, flexible PVC tubing, whereas the fill manifold 78 is made of a rigid tubing, such as, for example, PVC. The row 66 includes a supply connector 82 and a return connector 86 that connect to the supply and return manifolds 58, 62, respectively, of the grid 56. In particular, the supply connectors 82 of the row 66 connect together to form a continuous supply manifold 58, and the return connectors 86 of the row 66 connect together to form a continuous return manifold 62. The supply and return connectors 82, 86 are T-shaped and made of a rigid plastic, such as a PVC.

Figure 4:
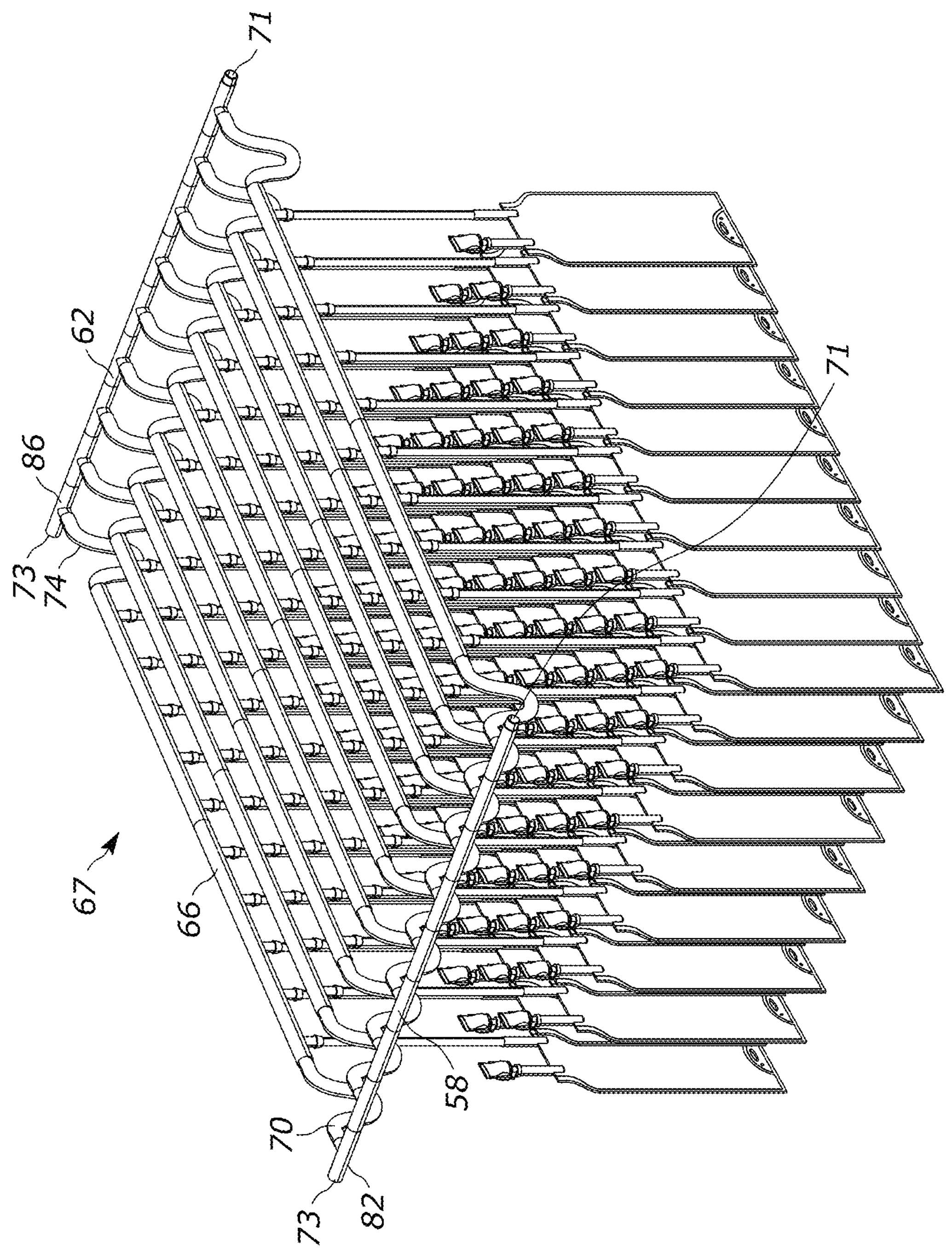
FIG. 4 is a perspective view of an exemplary group of containers isolated from the cartridge of FIG. 2.
Figure 5:
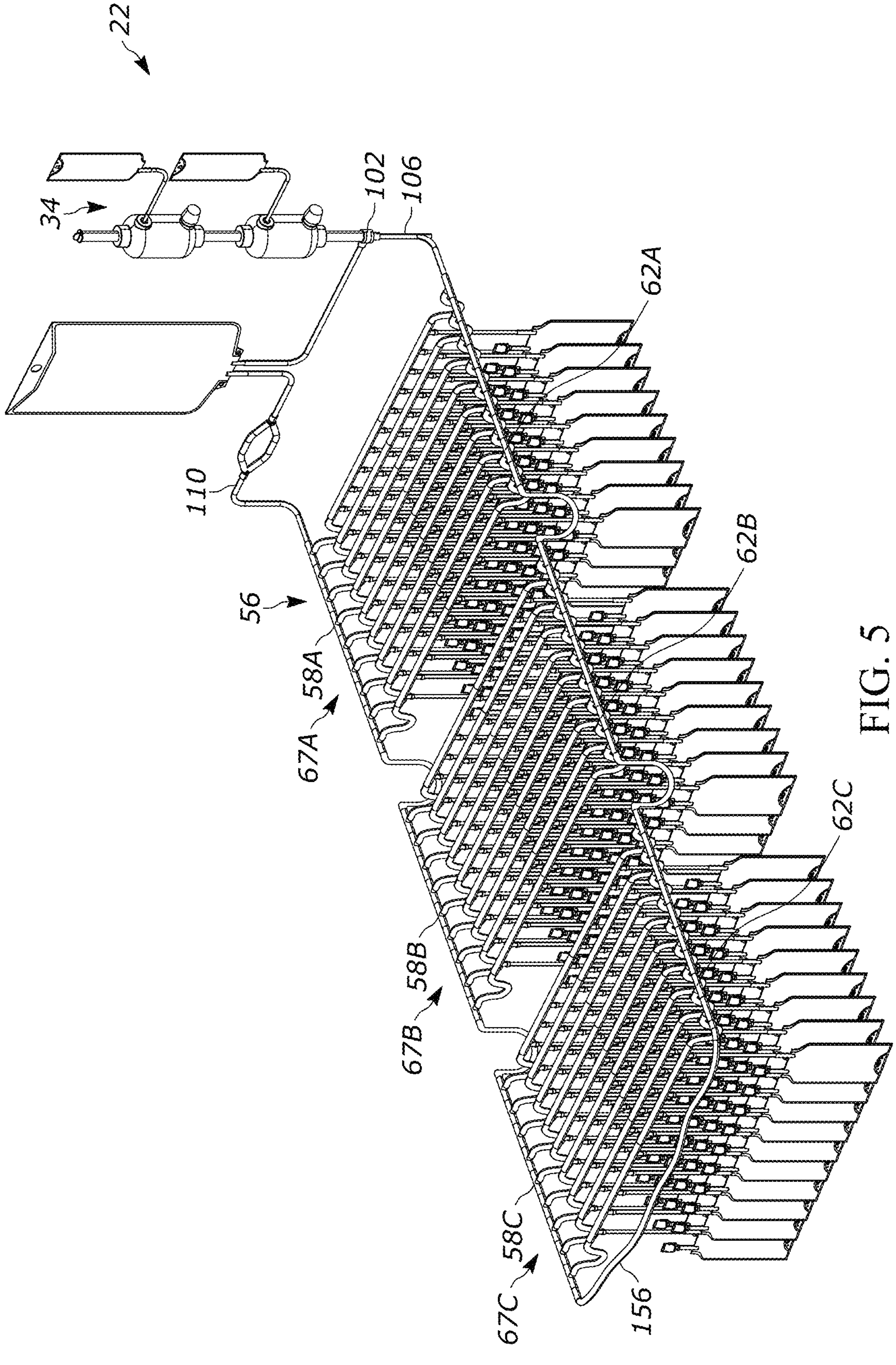
FIG. 5 is a perspective view of a different exemplary cartridge with three groups of containers assembled in accordance with the teachings of the present disclosure.

FIG. 4 illustrates an exemplary group of bags 67 of the first exemplary cartridge 22. The group 67 includes a plurality of rows 66 connected together via the connectors 82, 86 to form the supply and return manifolds 58, 62. The group 67 is a modular unit having first and second open ends 71, 73 that may be connected to a final row 156, another group 67, or the supply and return lines 106, 110 of the cartridge 22. For example, in FIG. 5 the cartridge 22 includes three connected groups 67A, 67B, 67C. The first group 67A is connected to the supply and return lines 110, 1106, and to the second group 67B of bags. The second group 67B is connected to the supply and return manifolds 58, 62 of the first and third groups 67A, 67C, and the third group 67C is connected to the second group 67B and a final row 156 to complete a closed cartridge. The modular arrangement of the group 67 of bags enables filling more bags per filtration assembly 34. As shown in FIG. 5, the supply and return manifolds 58, 62 of each group 67 are connected to provide a cartridge 22 with 270 bags.

While the schematic cartridge 22 of FIG. 1 includes four rows 66 of eight product bags 26, and the exemplary cartridge 22 of FIG. 2 includes nine rows 66 of ten product bags 26, other exemplary cartridges 22 may include more or fewer rows 66 with more or fewer product bags 26. In fact, cartridge size may be determined based on capacity of a gamma radiation carrier used for sterilizing each cartridge prior to use. The cartridge of FIG. 5 includes three groups 67A, 67B, and 67C, but may be arranged to connect with additional groups 67. The group 67 of FIG. 4 is sized in order to maximize the number of bags per cartridge that may be gamma sterilized at one time. However, in other examples, the number of rows 66 and number of bags 26 per row 66 may vary.

As shown in FIGS. 1 and 2, the reservoir 38 is coupled to the solution distribution grid 56, disposed upstream from the plurality of bags 26 and the second pump 44, and disposed downstream from the filter assembly 34. In this example, the reservoir 38 is a flexible bag 38, but may be a different type of container that can maintain the solution in a sterile environment. The reservoir 38, which may be an intermediate bag, includes a volume or bladder 90, an inlet port 94, an outlet port 98, and a solution recovery port 168 and is coupled to the grid 56 of the cartridge 22 to supply the plurality of bags 26 with sterile solution. Because the reservoir 38 is disposed between the filter assembly 34 and the second pump 44, the second pump 44 draws filtered solution from the bladder 90 of the reservoir 38 to fill the remainder of the connection line 46 (downstream from the reservoir 38) and supply the solution distribution grid 56 with sterile solution.

Generally speaking, the reservoir 38 is coupled to the grid 56 by connections at the inlet and outlet ports 94, 98, thereby forming a complete loop. The inlet port 94 of the reservoir 38 is connected to a T-connector 102 that receives both (1) a solution filtered through the filter assembly 34, and (2) a solution from a return line 106 of the grid 56. The outlet port 98 of the reservoir 38 is coupled to a supply line 110, which provides a solution pathway to the supply manifold 58. The supply line 110 includes a peristaltic tubing portion 114 for operatively coupling the connection line 46 to the second pump 44, which may be a peristaltic pump. The closed loop forms by connecting the outlet port 98 to the supply line 110, which is connected to the supply manifold 58 that is coupled to the return manifold 62, and connecting the return line 106, which is coupled to the return manifold 62, to the inlet port 94. So configured, the supply manifold 58 fluidly connects the first end 70 of each row 66 to the outlet port 98 of the reservoir 38, and the return manifold 62 fluidly connects the second end 74 of each row 66 to the inlet port 94 of the reservoir 38. Additionally, and as will be described below, the return manifold 62 also provides a solution return path during various cycles while running the system 10 to deliver purged air as well as unused solution from the grid 56 and to the reservoir 38.

Solution pumped from the mix tank 14 must first pass through the filter assembly 34 before reaching the reservoir 38. The filter assembly 34 of the cartridge 22 includes a first filter 118 and a second filter 122 arranged in series. Each filter 118, 122 is a sterilizing grade filter, and may be selected based on compatibility with the solution, sterilizing technology, and required fill rate. As shown in FIG. 2, each filter 118, 122 is coupled to a sample bag 126, 130, respectively. The sample bags 126, 130 are used to receive purged air and solution samples. The sample bag 126 receives a sample of pre-filter solution, and sample bag 130 receives a solution sample after the first filter 118 and before the second filter 122. The sample bag 130 also receives purged air from filter 118. Purged air from the second filter 122 is collected in the reservoir 38. The solution from sample bag 130 is tested in lab for any growth to determine its effectiveness. The first and last filled bags 26 from the cartridge 22 are tested for testing effectiveness of the filter assembly 34. The filter assembly 34 lasts for the duration of the fill (i.e., the entire cartridge 22) with a stable flow rate and ability to filter out any bioburden. However, if there are any deficiencies in the performance of either the first or second filters 118, 122, an operator may be able to detect such issues by analyzing the filters via a filter integrity test at the end of a cartridge fill, and testing the contents of the sample bags 130 and the first and last filled bags 26 from the cartridge 22 for any particulate matter or bio contamination. At the end of the filling cycle, the filter assembly 34 is discarded with the remainder of the single-use cartridge 22. The used filter cartridge 22 is tested for leaks with a vacuum leak detector. Any leaks detected in the cartridge 22 trigger an automatic hold on the bags 26 filled. In another example, the used filter cartridge 22 may be tested for flaws using integrity testing methods.

The cartridge 22 is pre-assembled in a clean room (ISO 7/ISO8) and gamma sterilized prior to being connected to the solution supply system (i.e., the mix tank 14 and feed line 18) to ensure that all surfaces that come into contact with the filtered solution are sterile. The solution distribution grid 56 is primarily designed for "single use." However, the cartridge 22 may be adapted for multiple uses depending on assembly components, component materials, safety, and sterilization methodology. The solution distribution grid 56 is designed to (1) ensure that the solution is directed to a targeted product bag 26 without any risk of contamination; (2) isolate the product bags 26 not being filled; (3) enable removal of any trapped air in the grid 56 prior to filling the product bags 26; and (4) provide direct flow paths to all product bags 26 in the grid 56 to fill the bags 26 with a high level of accuracy and repeatability without the need for fill pump recalibration.

Figure 6A:
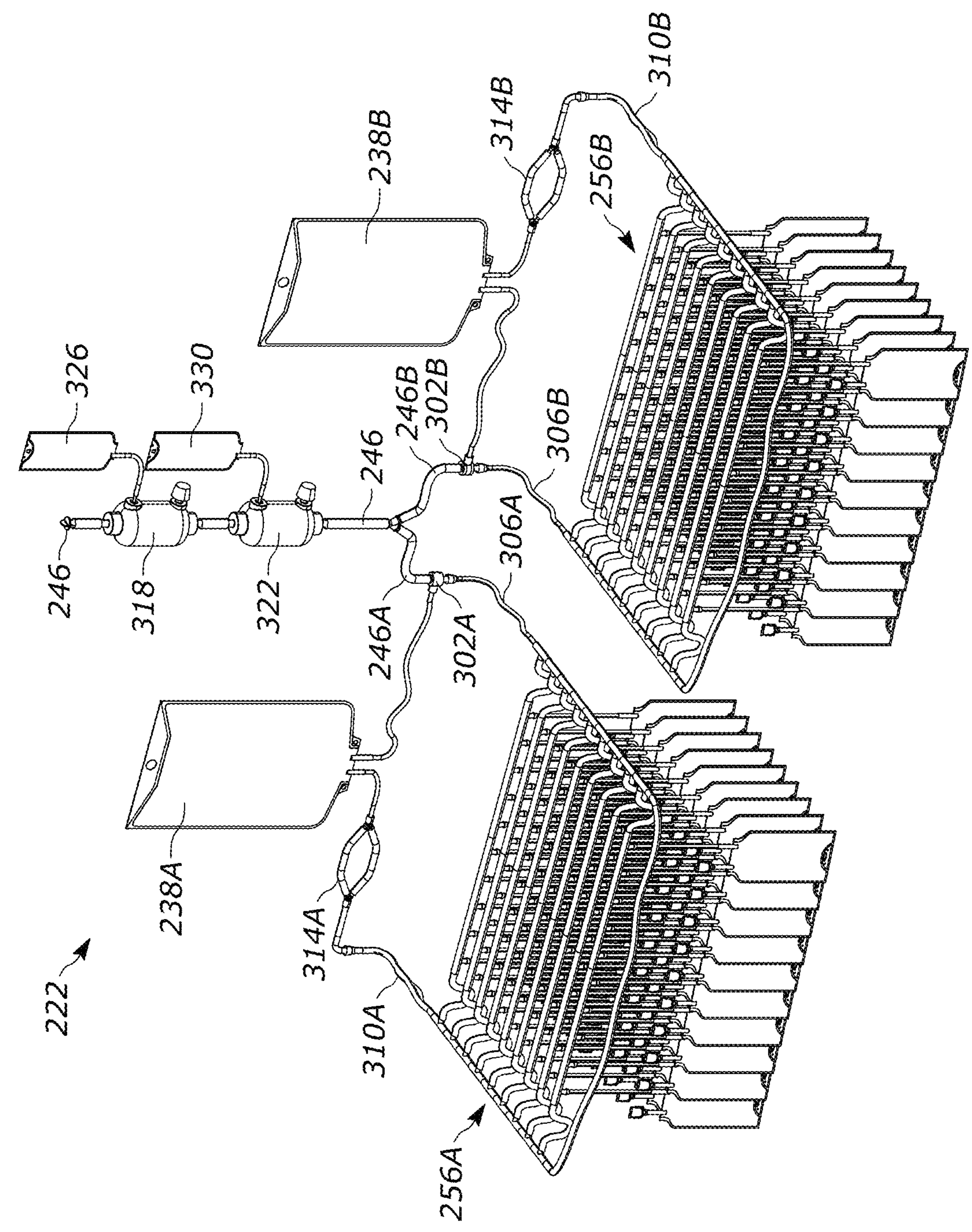
FIG. 6A is a perspective view of a second exemplary cartridge that may be used with the system of FIG. 1, and is assembled in accordance with the teachings of the present disclosure.
Figure 6B:
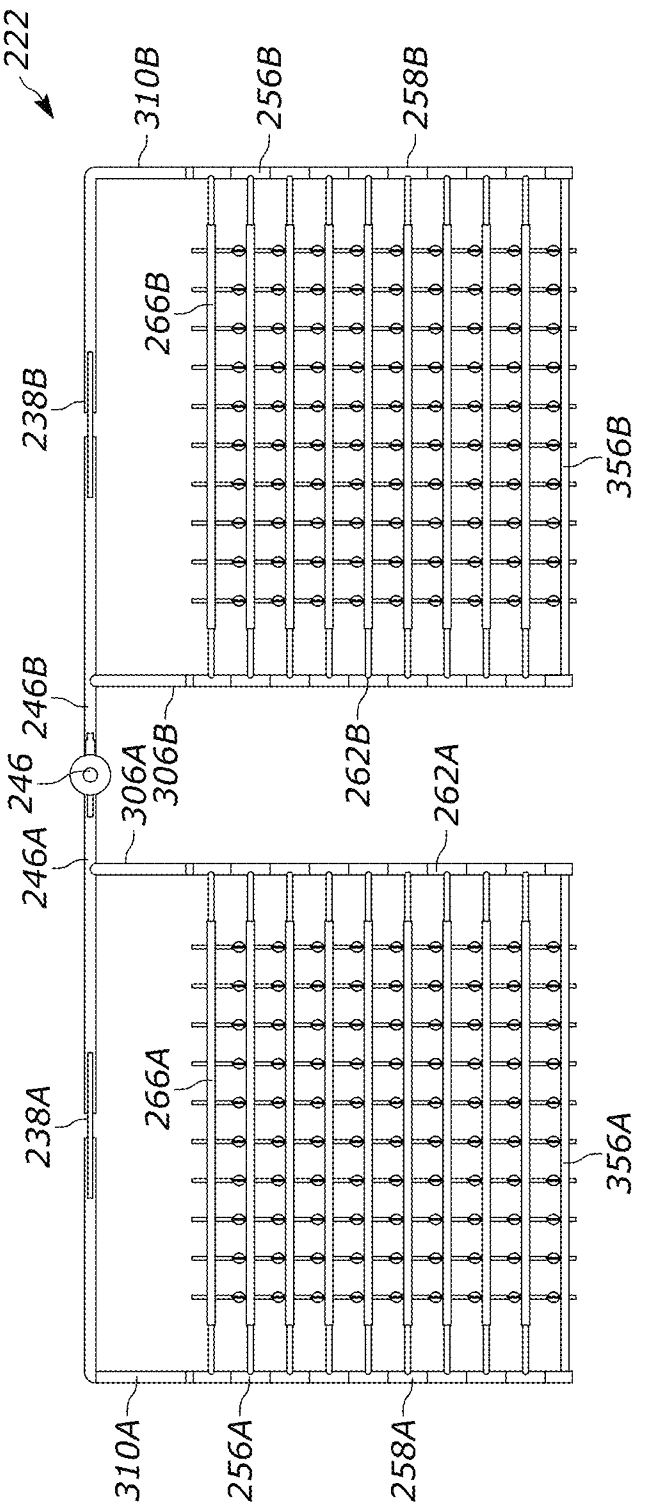
FIG. 6B is a top view of the cartridge of FIG. 6A.
Figure 6C:
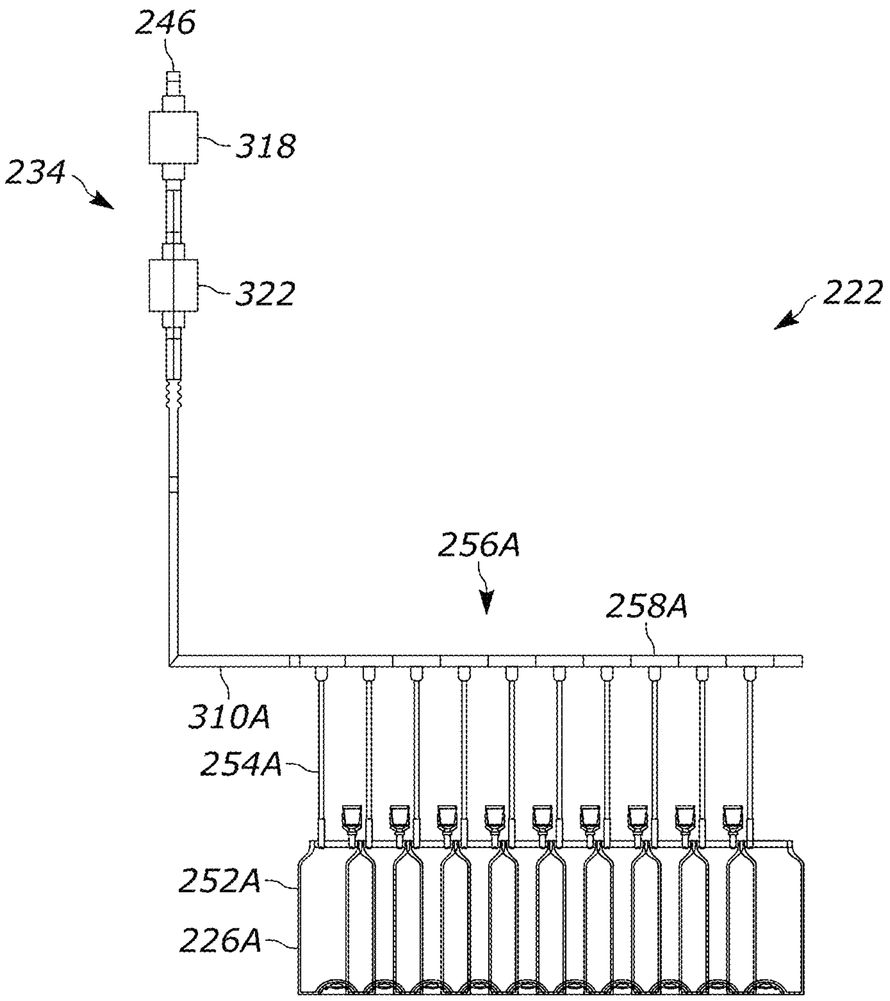
FIG. 6C is a side view of the cartridge of FIG. 6A.

FIGS. 6A, 6B, and 6C illustrate a second exemplary cartridge 222 that may be used with the system 10 of FIG. 1 to provide a plurality of sterile solution-filled product bags. The second exemplary cartridge 222 is similar to the first exemplary cartridge 22 of FIGS. 1-3. Thus, for ease of reference, and to the extent possible, the same or similar components of the cartridge 222 will retain the same reference numbers as outlined above with respect to the first exemplary cartridge 22, although the reference numbers will be increased by 200 and will include an "A" or a "B" where appropriate. However, the second cartridge 222 differs from the first exemplary cartridge 22 by providing one filter assembly 234 coupled to two different solution distribution grids 256A, 256B.

Figure 25:
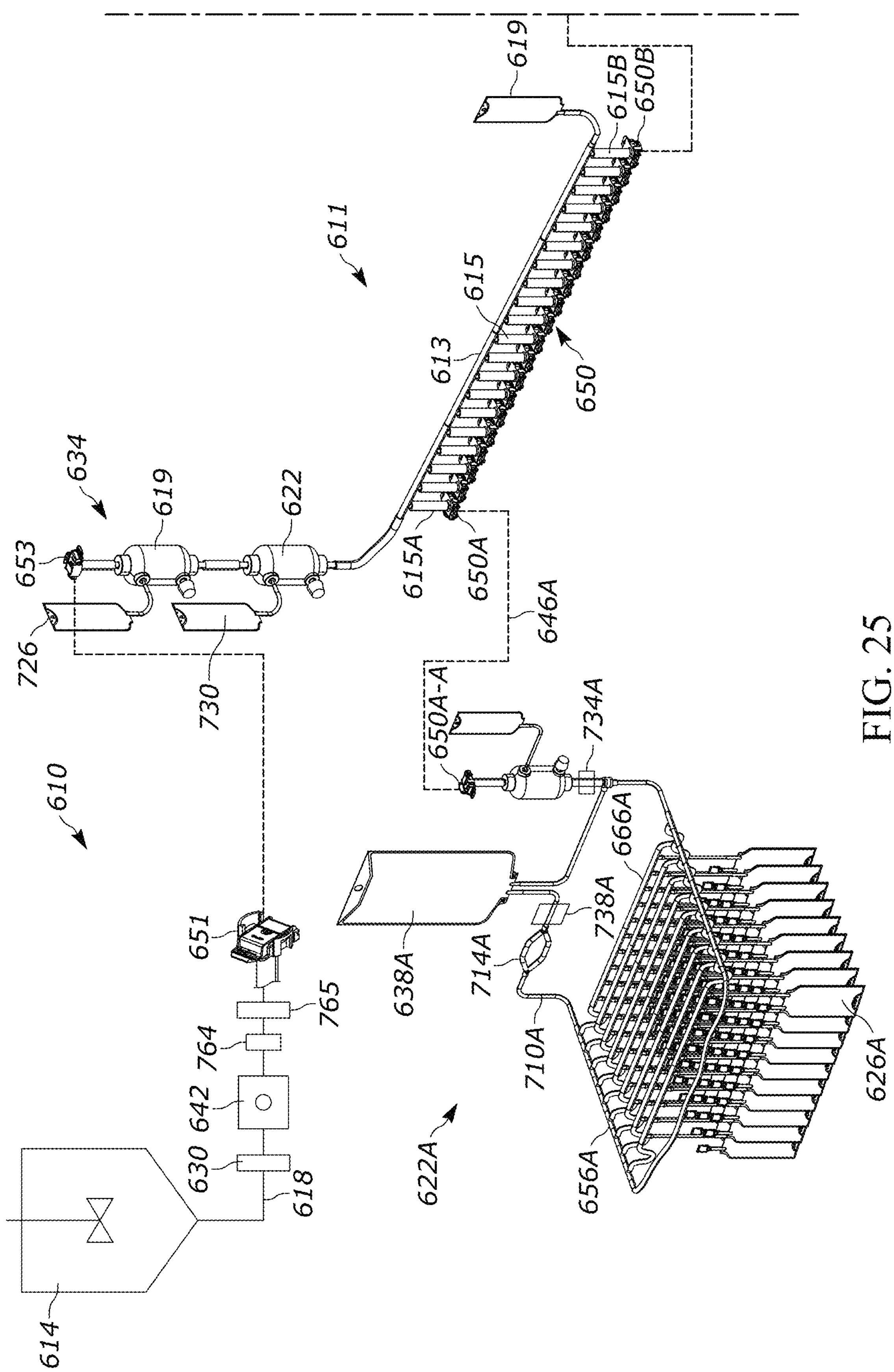
FIG. 25 is an exemplary system of a plurality of cartridges connected to a single filter assembly assembled in accordance with the teachings of the present disclosure.
Figure 25:
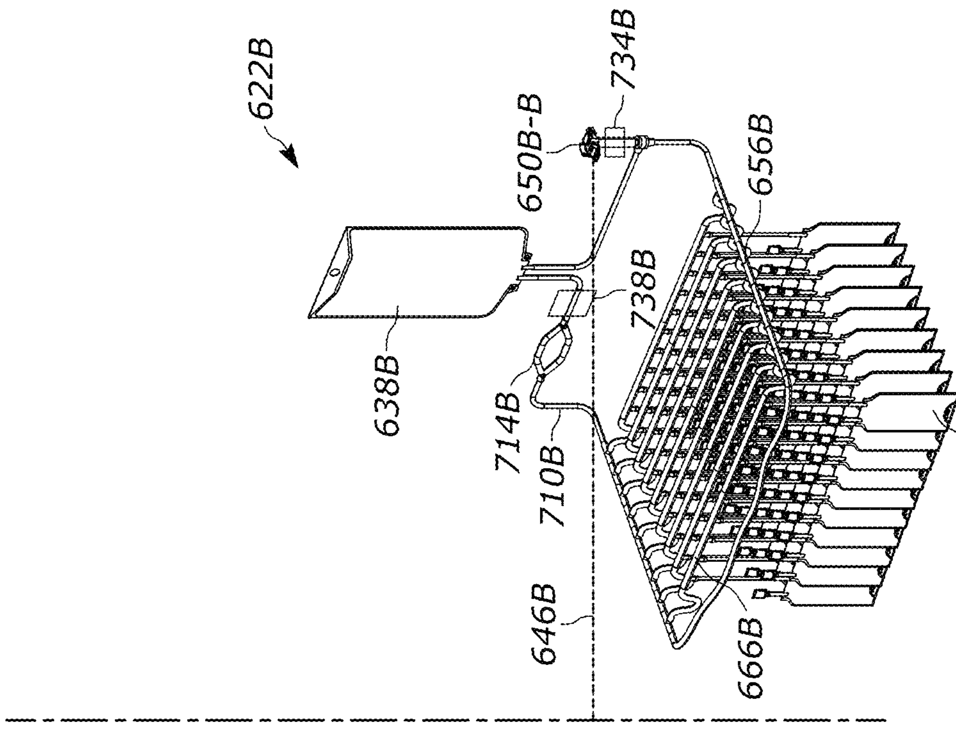

As shown in FIG. 6A, the filter assembly 234 includes a first filter 318 and a second filter 322 disposed in series and coupled to a first reservoir 238A of the first solution distribution grid 256A and a second reservoir 238B of the second solution distribution grid 256B. So configured, the cartridge 222 is coupled to the feed line 18 of the system 10 of FIG. 1 at the cartridge connector 50. Just as the reservoir 38 of the first exemplary cartridge 22 is filled with solution, the first and second reservoirs 238A, 238B of the second exemplary cartridge 222 are also filled with a sterile solution. The two sterilizing grade filters 318, 322 sterilize enough solution to fill twice as many product bags as the single cartridge 22. As shown in FIG. 6A, a main connection line 246 coupled to the filter assembly 234 splits into a first connection line 246A and a second connection line 246B, where each connection line 246A, 246B connects to a T-connector 302A, 302B of each respective grid 256A, 256B. In another example, multiple individual cartridges may be assembled to a single filter train with additional connectors (FIG. 25).

Figure 7:
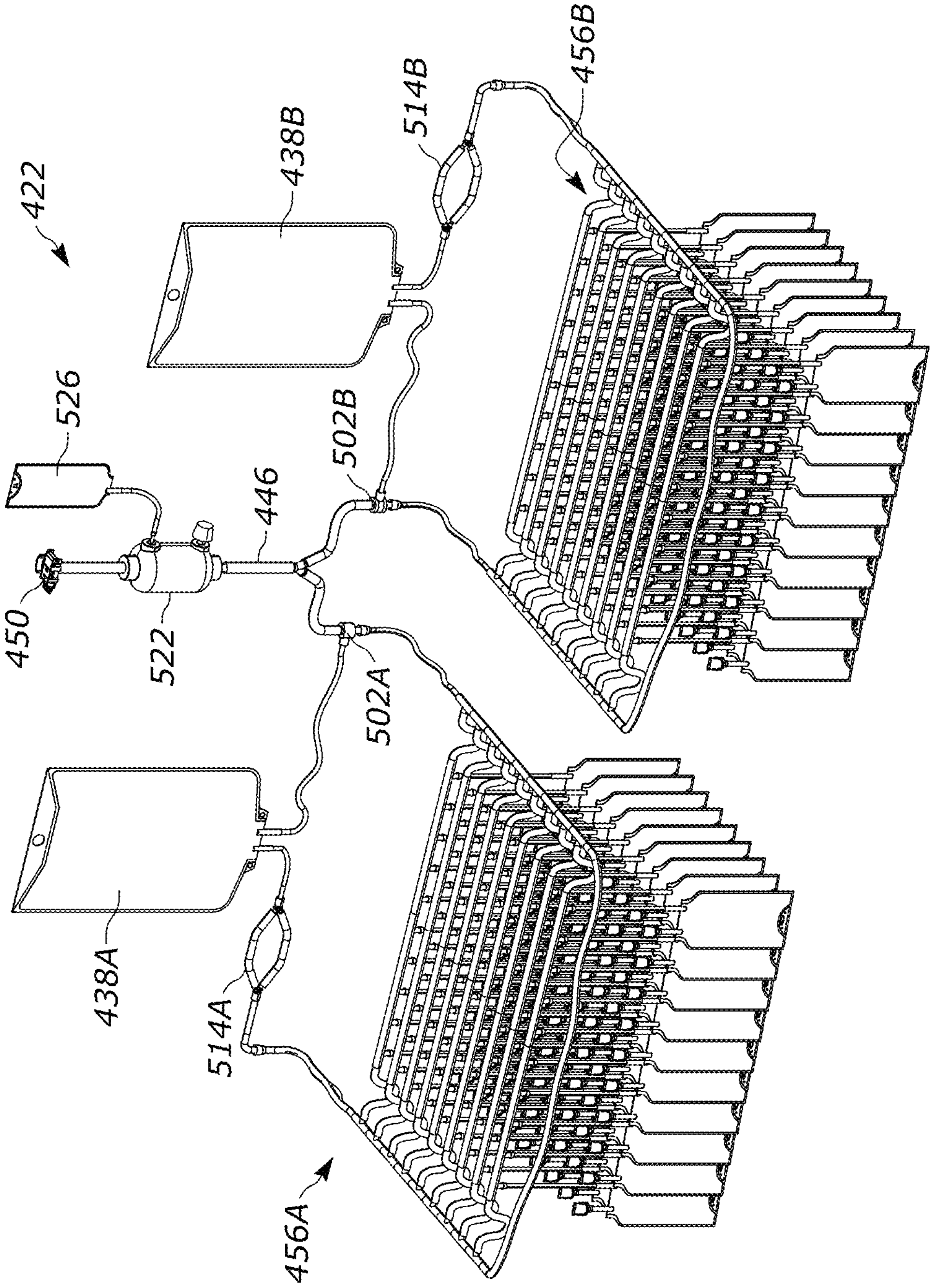
FIG. 7 is a perspective view of a third exemplary cartridge that may be used with the system of FIG. 1, and is assembled in accordance with the teachings of the present disclosure.
Figure 8:
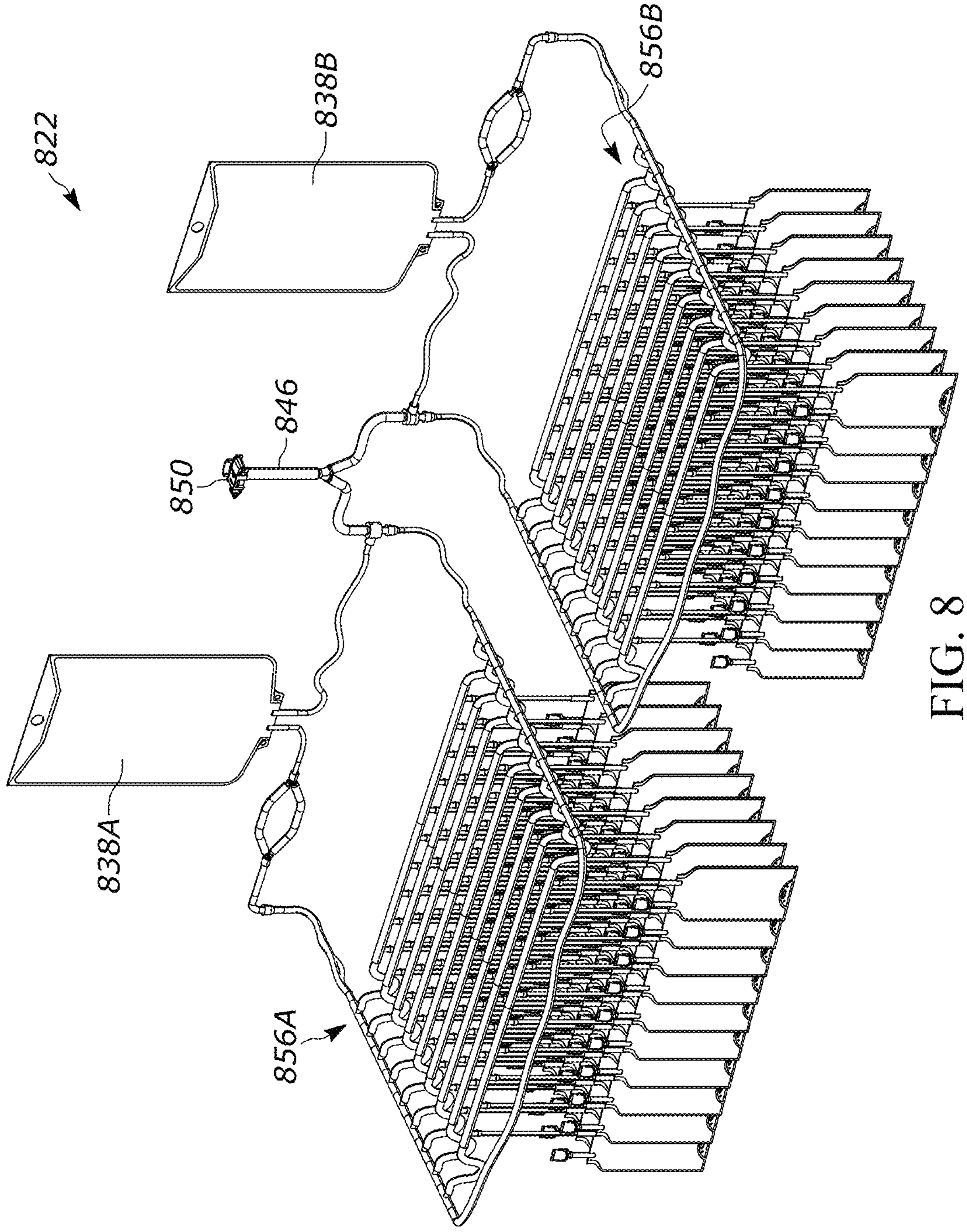
FIG. 8 is a perspective view of a fourth exemplary cartridge that may be used with the system of FIG. 1, and is assembled in accordance with the teachings of the present disclosure.

Other cartridge configurations are possible, and may be designed specifically to address the needs of the system 10 or various environmental or budgetary constraints. For example, the placement of a cartridge connector 50 may vary to enhance versatility of cartridge configurations. For example, a different example cartridge 422 in FIG. 7 includes an aseptic cartridge connector 450 adjacent to a single filter 522 of a filter assembly for connecting to a mating connector 50 in the feedline 18. In yet another example in FIG. 8, an example cartridge 822 has an aseptic cartridge connector 850 disposed downstream of a filter assembly. This configuration reduces production costs for larger batches. By comparison to the filters 118, 122 of the cartridges 22 of FIGS. 2 and 5, the filters upstream from the cartridge 422, 822 are not discarded after filling, and may be used for a whole batch (e.g., more than 2000 bags). After filling, a new cartridge 422, 822 is connected to the filter line. The other components of the cartridges 422, 822 of FIGS. 7 and 8 are otherwise the same or substantially similar to the components of the cartridge 22 of FIG. 2. The aseptic cartridge connector may be an AseptikQuik® Sterile Connector.

Returning to FIG. 1, the system 10 includes a plurality of isolation valves to control the flow of solution through the feed line 18, connection line 46, supply line 110, supply manifold 58, return manifold 62, return line 106, each fill manifold 78, and each stem 54 of the plurality of bags 26. These valves are positioned adjacent to a flexible portion of tubing of the system 10 to isolate, pinch, engage, or otherwise close the flexible tubing to prevent solution from flowing through the flexible tubing, or open, release, or otherwise disengage from the flexible tubing to allow solution to flow through the valve and continue through the system 10. A first valve 165 is a main system isolation valve and is operated (e.g., open/close, release/pinch or engage) to control a solution supply from the mix tank 14 to the cartridge 22. A main feed valve 134 is always closed after the first pump 42 has been turned off to ensure that there is no back pressure or reverse flow through the filter. A third valve 138 is a supply valve and is located downstream from the reservoir 38 and upstream from the second pump 44. The supply valve 138 is operated to distribute solution from the reservoir 38 and into the solution distribution grid 56. A fourth valve 142 is a return valve located on the return line 106 to control a return of either purged air or unused solution from the grid 56 into the reservoir 38.

Additionally, the system 10 includes two groups of isolation valves operated to control the flow of solution through each row 66 of bags 26. The first group of isolation valves includes a first column of supply manifold valves 146 (which may include one or more valves, depending on the number of rows 66 of the cartridge 22) and a second column of return manifold valves 150. The first and second columns 146, 150 are pinch valves and are arranged according to the number of rows and layout of the grid 56. Specifically, the first and second columns 146, 150 are arranged near the first ends 70 and second ends 74, respectively, of the rows 66. However, in other examples, these isolation valves may be a different type of valve and may be arranged in a different configuration according to the layout of the solution distribution grid 56. A supply manifold valve 152 and a return manifold valve 154 are coupled to a final row 156 of the grid 56. The final row 156 does not include any fill ports connected to product bags 26, but instead the final row 156 connects the supply and return manifolds 58, 62 to complete the loop of the grid 56 to purge the grid 56 of either air or solution, depending on the phase of the filling cycle.

A second group of valves 160 are fill valves and are disposed between the first column and the second column of valves 146, 150. The fill valves 160, which may also be pinch valves, are operated to control the flow of solution from the fill manifold 78 into each bladder 52 of the plurality of bags 26. The fill valves 160 are positioned so that each valve 160 is adjacent to the flexible tubing of one stem 54 of the plurality of bags 26. As shown in FIG. 1, the fill valves 160 are adjacent to the stems 54 of the plurality of bags 26 of the first row 66. As will be discussed below, the fill valves 160 are movable relative to the cartridge 22 to engage the stems 54 of the plurality of bags 26 of each additional row 66. However, in another exemplary arrangement, the system 10 may include further sets of valves 160 corresponding with the number of rows 66 in the cartridge 22 so that there is a pinch valve for each stem 54 of the cartridge 22.

Turning now to FIGS. 9-17, a fill cycle of the system 10 will be illustrated and described in different phases of the filling cycle. Initially, the feed line 18 is purged of any trapped air by running the first pump 42. As solution is drawn from the mix tank 14 and into the feed line 18, any air in the feed line 18 is pushed through a vent 164, which is disposed downstream from the first pump 42 and upstream from the main isolation valve 165. While the feed line 18 is purged and air vented through the vent 164, the main system isolation valve 165 closes, thereby isolating the entire cartridge 22 and the filter assembly 34 from the feed line 18.

Figure 9:
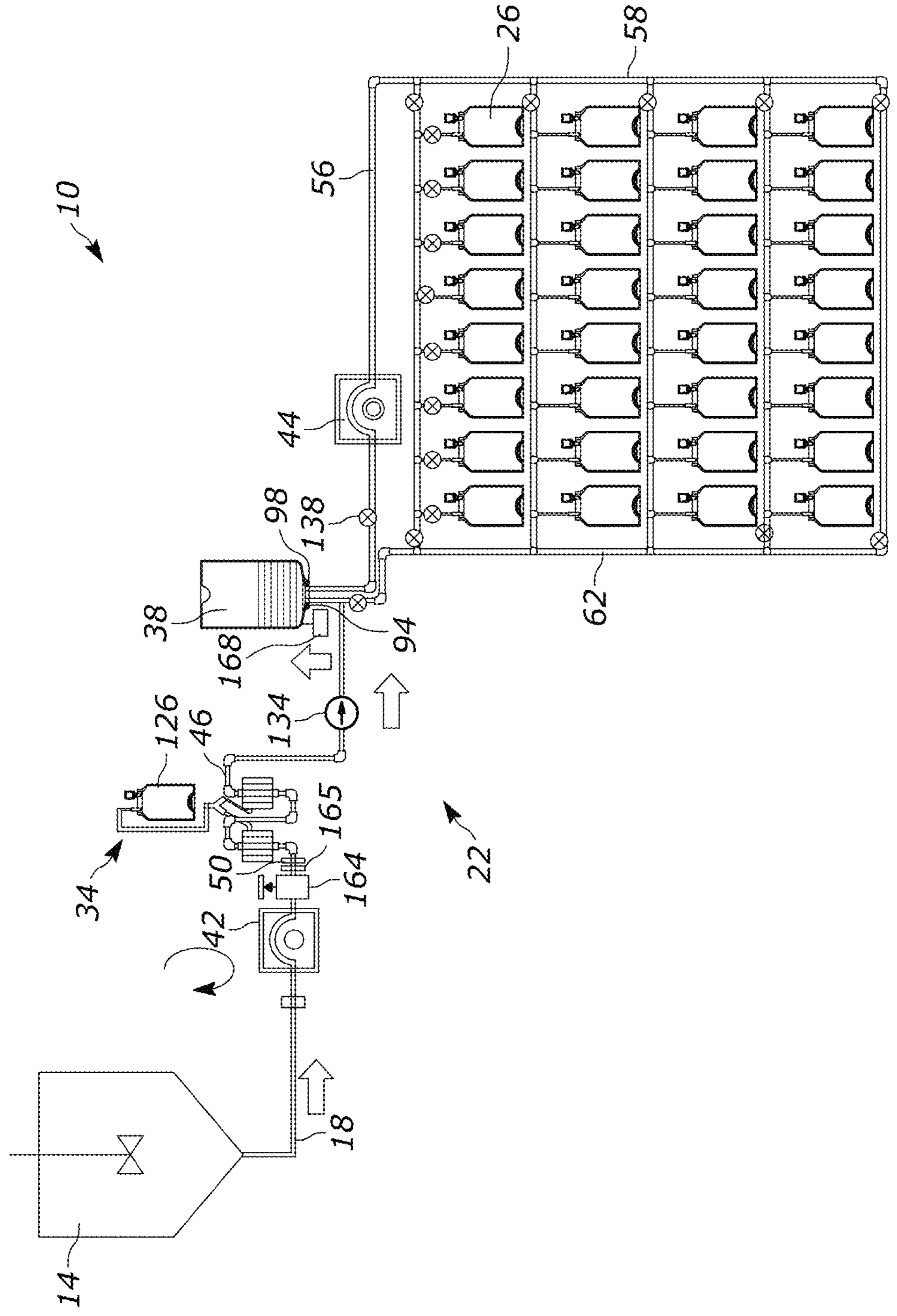
FIG. 9 is a schematic diagram of the system of FIG. 1 during a phase of the filling process showing wetting a filter assembly and filling a reservoir of a cartridge.

After the air is purged from the feed line 18, the main system isolation valve 165 opens, the supply valve 138 and the return valve 142 close, and the first pump 42 pumps solution from the mix tank 14 to wet the filter assembly 34 of the cartridge 22 to fill the reservoir 38 with a desired amount of solution. As shown in FIG. 9, the portion of the cartridge 22 downstream from the reservoir 38 is isolated to allow the filter assembly 34 to be properly wetted and for the reservoir 38 to fill with enough solution to purge the supply and return manifolds 58, 62 and a first fill manifold 78 of the cartridge 22 before filling the bags 26. The first pump 42 runs at a pace to sufficiently wet the filters without overwhelming the system 10. The sample bag 126 of the filter assembly 34 may be later analyzed to confirm suitable performance of the first filter 118 in the filter assembly 34. If the first filter 118 is compromised, the additional filter 122 of the two-filter filter assembly 34 ensures that the solution is sufficiently sterile upon passing to the reservoir 38.

Figure 10:
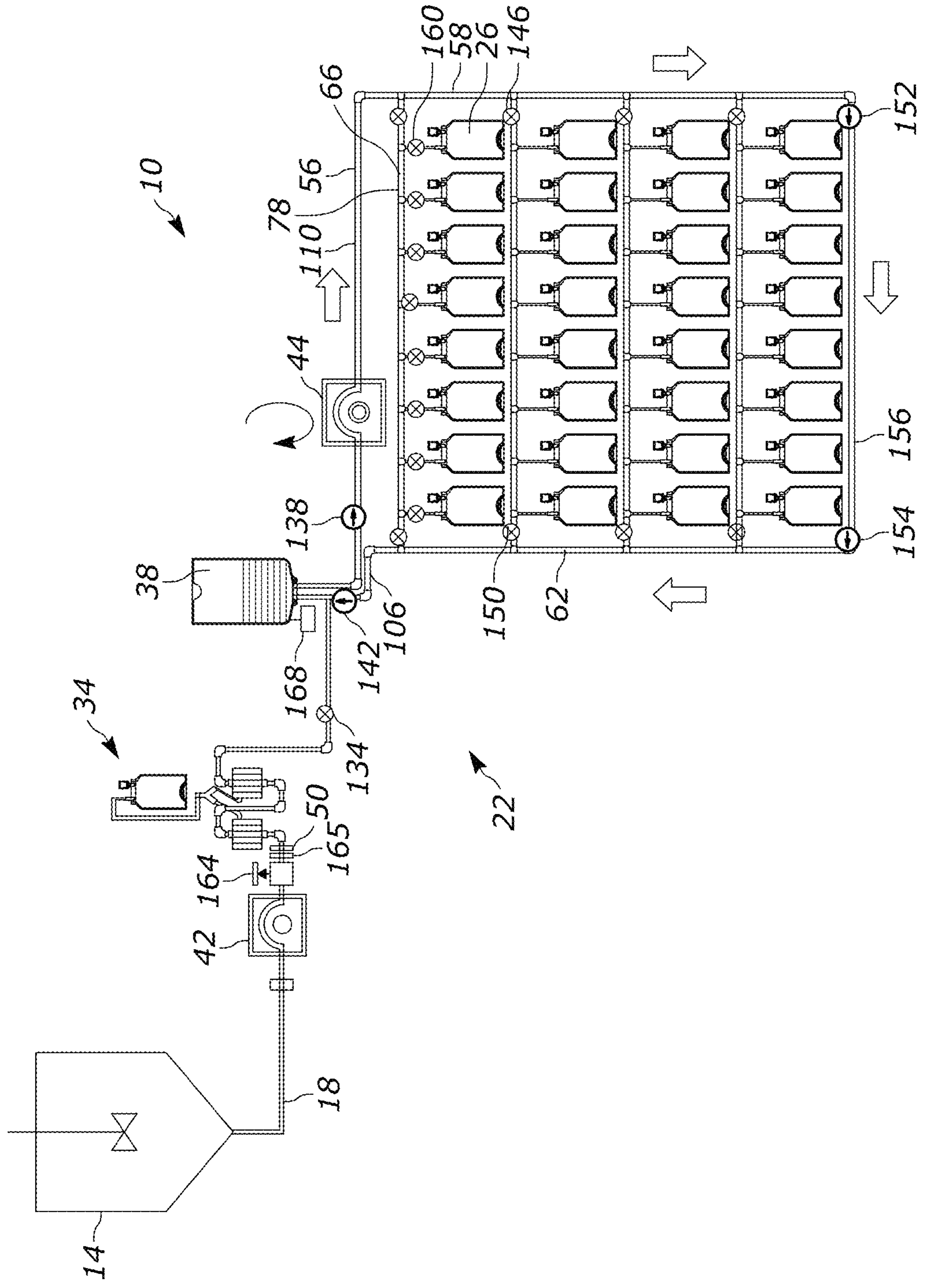
FIG. 10 is a schematic diagram of the system of FIG. 1 showing a purge phase of the supply and return manifolds of the cartridge.

In the next phase of the filling cycle shown in FIG. 10, the portion of the cartridge 22 downstream from the reservoir 38 opens to ready the system 10 for purging the cartridge 22 of trapped air and then filling the bags 26 with solution. In this phase, the supply valve 138 and the return valve 142 coupled to the outlet and inlet ports 98, 94 of the reservoir 38, respectively, open. Additionally, the supply manifold valve 152 and return manifold valve 154 coupled to the final row 156 of the solution distribution grid 56 open as well. The fill manifold 78 of each row 66 (not including the final row 156) is isolated as each supply manifold valve 146 and return manifold valve 150 closes (not including the supply and return manifold valves 152, 154 of the final row 156). The second pump 44 runs to purge the air trapped in the supply and return manifolds 58, 62 from the solution distribution grid 56. As indicated by the arrows in FIG. 10, solution from the reservoir 38 pushes the air through the outlet port 98, supply line 110, the supply manifold 58, the final row 156, the return manifold 62, the return line 106, and into the inlet port 94 of the reservoir 38. The reservoir 38, which is disposed at least partially above the solution distribution grid 56 (with respect to gravity), receives and traps the purged air in the headspace of the reservoir 38. This configuration facilitates air management by advantageously using the buoyancy of the air to push the solution (coming in from below the air, or headspace, of the bag) to ensure accurate filling volumes. As the air is purged from the supply and return manifolds 58, 62, sterile solution fills the outer perimeter of the grid 56.

Figure 11:
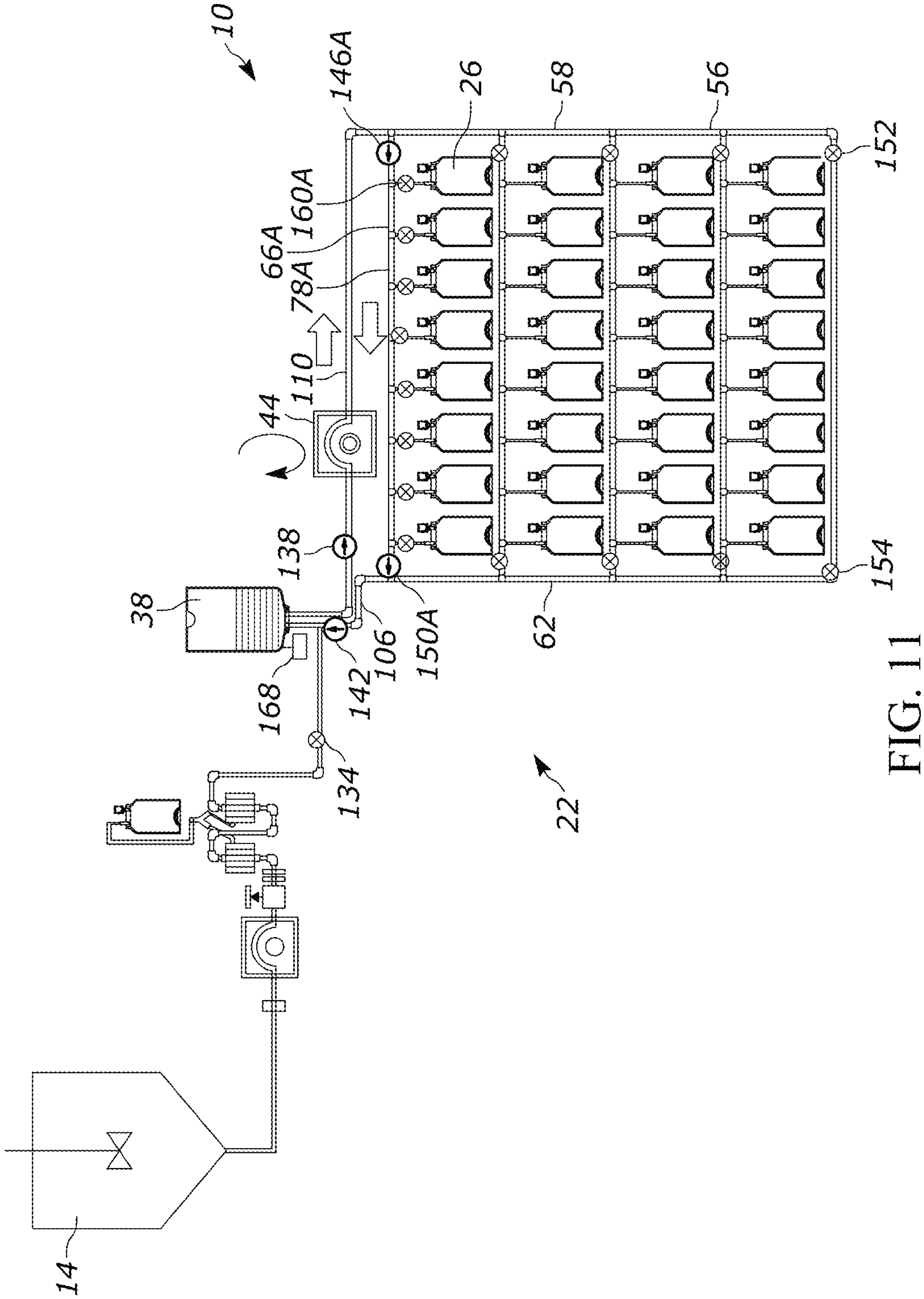
FIG. 11 is a schematic diagram of the system of FIG. 1 showing a purge phase of a fill manifold of a first row of the cartridge.

In FIG. 11, a first row 66A of the grid 56 is purged of air trapped in the fill manifold 78A. To purge the air, a first supply manifold valve 146A and a first return manifold valve 150A on opposite ends of the row 66A open, and the supply and return manifold valves 152, 154 of the final row 156 close. Valves 146 and 150 from other rows 66 remain closed. The second group of valves 160 remain closed to isolate the plurality of bags 26. As shown by the arrows, air trapped in the grid 56 is purged only from the first row 66A.

Figure 12:
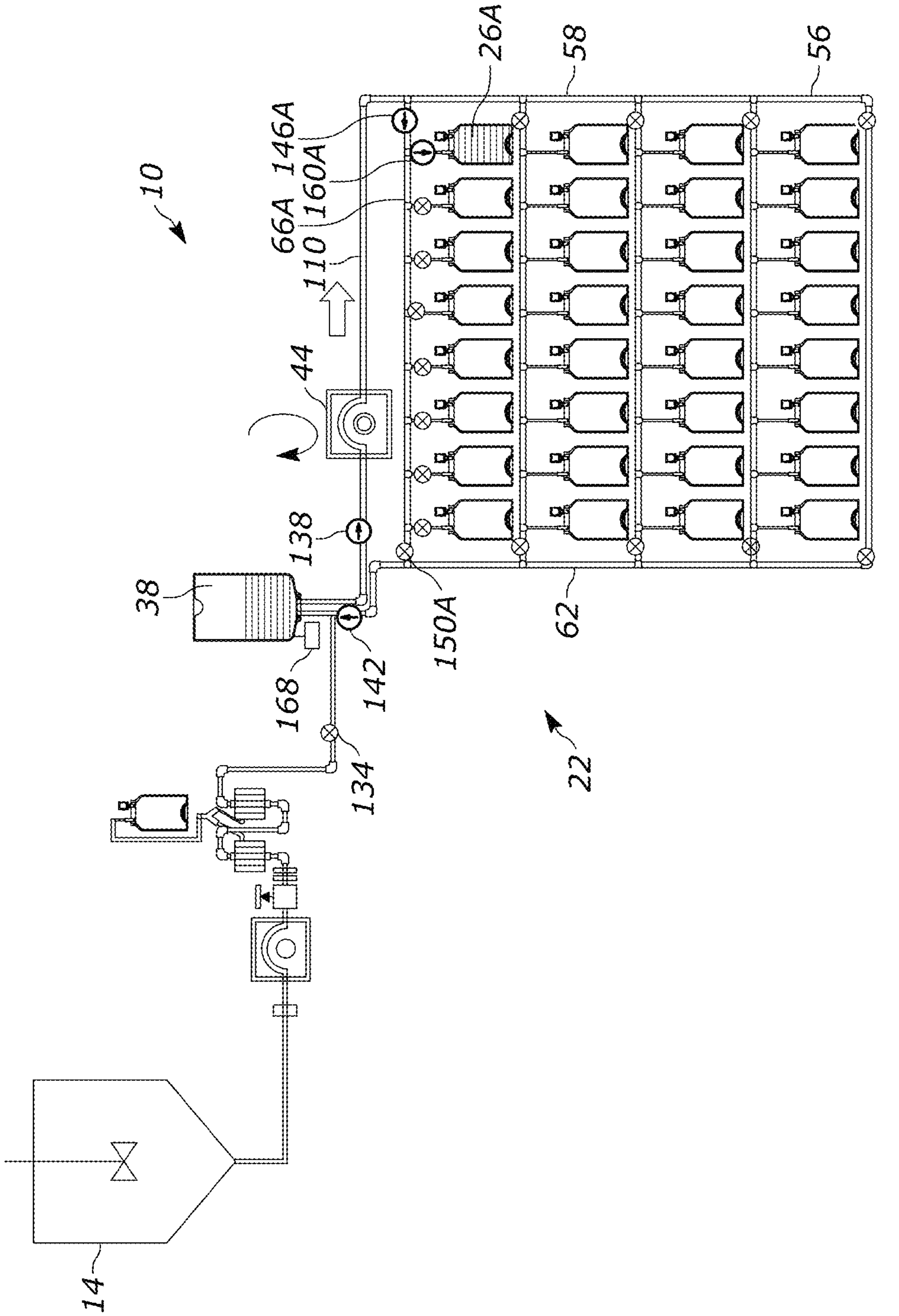
FIG. 12 is a schematic diagram of the system of FIG. 1 showing a filling phase of a first bag of the first row of the cartridge.
Figure 13:
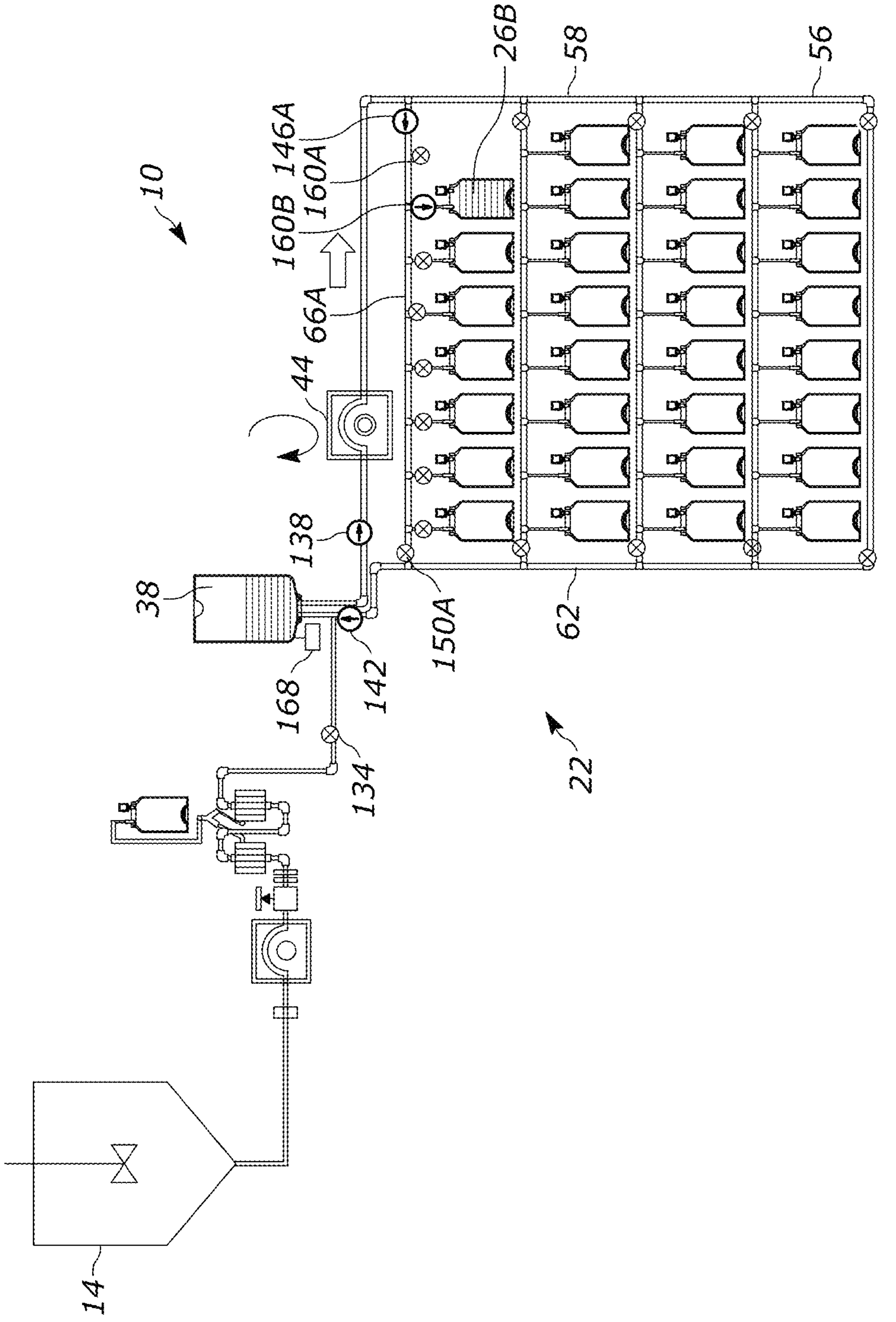
FIG. 13 is a schematic diagram of the system of FIG. 1 showing a filling phase of a second bag of the first row of the cartridge with the first filled bag sealed and removed from the cartridge.

FIG. 12 illustrates a first bag 26A of the first row 66A being filled. To fill the bags 26 of the first row 66, the supply manifold valve 146A of the first row 66A remains open, the return manifold valve 150A of the first row 66A closes, and solution fills the fill manifold 78A of the first row 66A. A first fill valve 160A opens to allow solution to flow through the stem 54 and into the bladder 52 of the first bag 26A. The second pump 44 meters the required solution into the first bag 26A to avoid under-filling or overfilling each bag 26 during the fill cycle. Once the first bag 26A is filled, the first fill valve 160A closes around the stem 54 of the first bag 26A and a second fill valve 160B of an adjacent second product bag 26B opens. While the second bag 26B is filled, the stem 54 of the first bag 26A is sealed at a location between the bladder 52 and the fill manifold 78, and specifically below the first fill valve 160A. After an adequate seal is made, the first bag 26A is separated from the fill manifold 78A of the cartridge 22, as shown in FIG. 13.

This process is repeated for the remaining bags 26 of the first row 66A until each bag 26 is filled, sealed, and separated from the grid 56. As will be described below, a seal and cut assembly of a filling machine may automatically seal and cut each stem 54 once each bag 26 is filled. The filling machine automates the filling cycle by communicating with the fill valves 160 and with the seal and cut assembly so that before each bag 26 is cut from the grid 56, the bag 26 is filled with the required volume of solution, the fill valve 160 closes around the stem 54, and a suitable seal is formed on the stem 54.

The seal and cut assembly is configured to move in a lateral direction parallel to the row 66 to consecutively seal and cut each stem 54 of the plurality of bags 26 in the row 66. Filling, sealing, and cutting may occur simultaneously on different bags 26 of the same row. For example, when a third bag 26 is being filled, a sealing device of the seal and cut assembly may seal the stem 54 of a second filled bag 26 while a cutting device of the seal and cut assembly cuts the stem 54 at the seal of the first filled bag 26. Each filled, sealed, and cut bag 26 is separated from the cartridge 22 and is received by a chute and/or a conveyor belt disposed below the grid 56. After the last bag 26 is sealed and removed from the row 66, the seal and cut assembly returns to an initial position (i.e., adjacent to where the first bag 26A was hanging before being separated from the grid 56) and moves toward a second row 66B of the cartridge 22.

Figure 14:
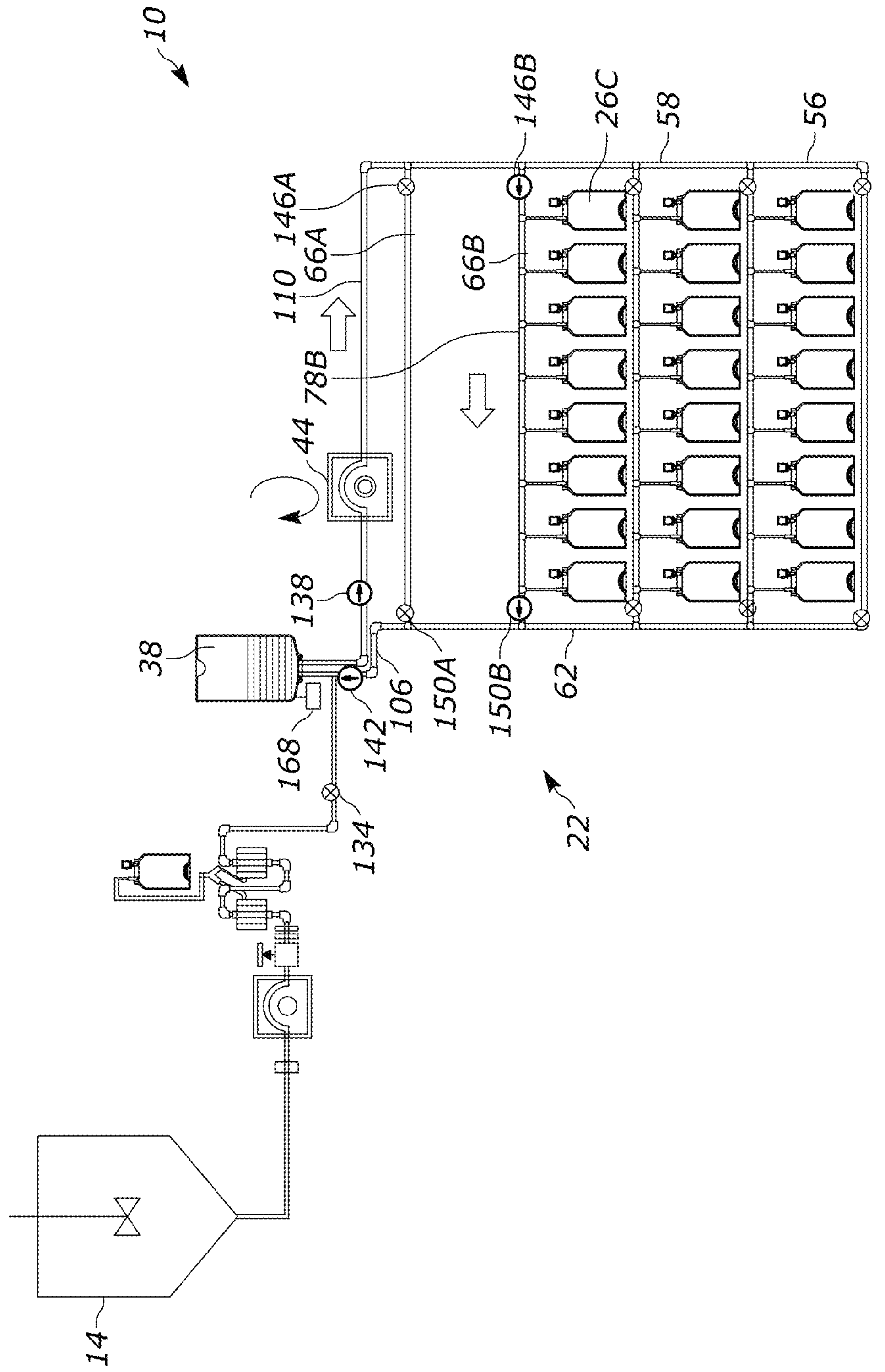
FIG. 14 is a schematic diagram of the system of FIG. 1 showing a purge phase of a fill manifold of a second row of the cartridge.
Figure 15:
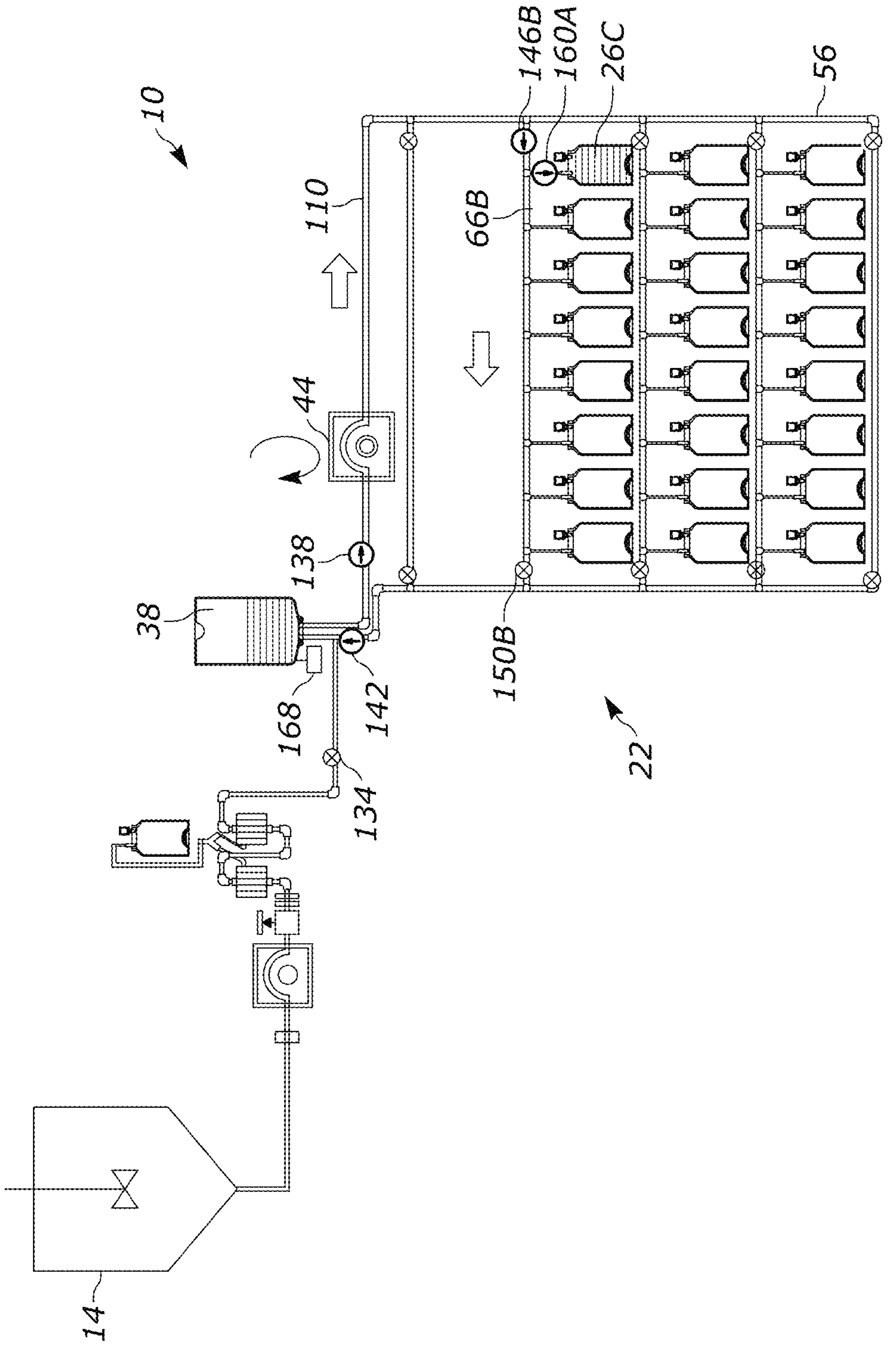
FIG. 15 is a schematic diagram of the system of FIG. 1 showing a filling phase of a first bag of the second row of the cartridge.
Figure 16:
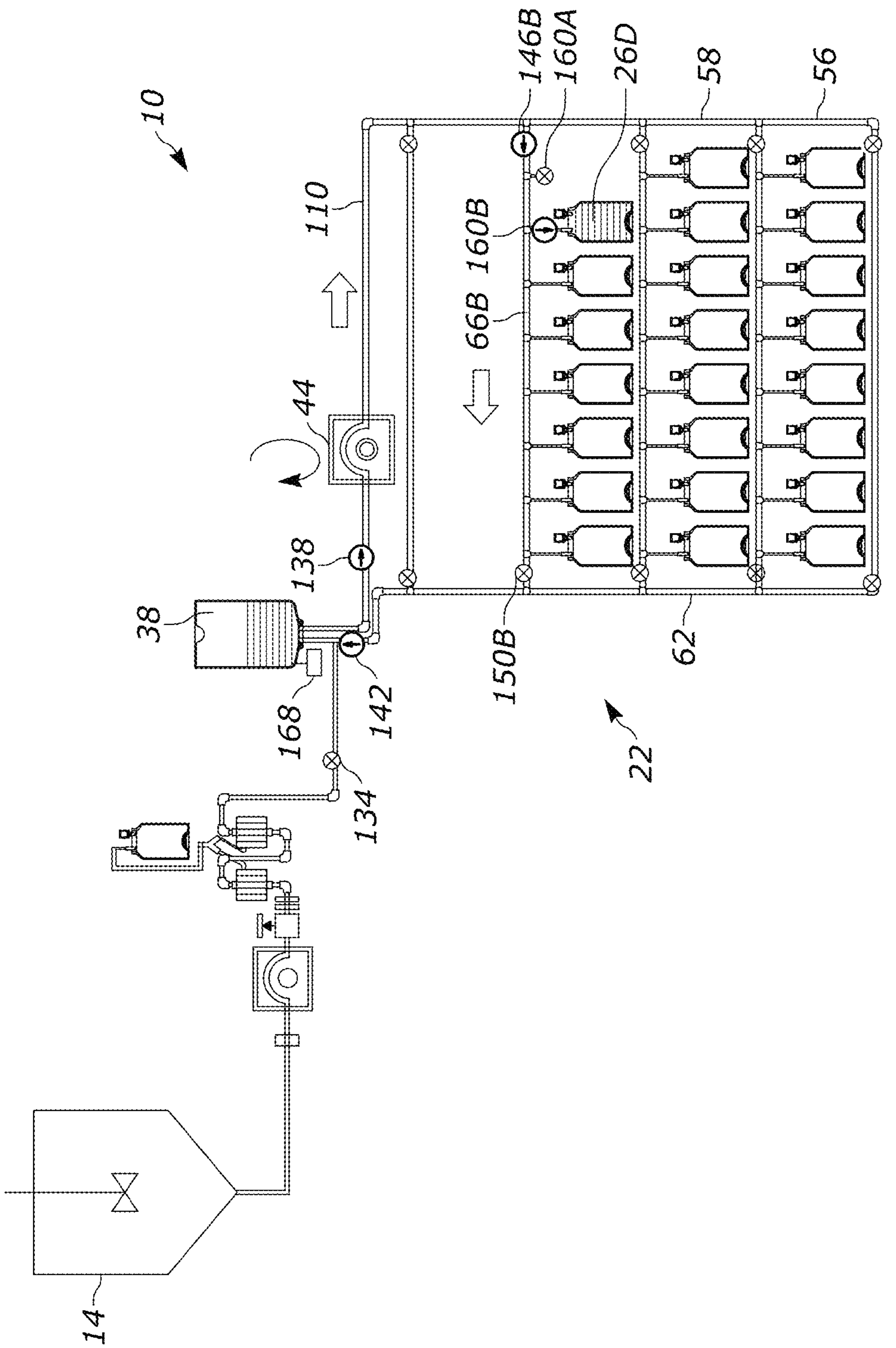
FIG. 16 is a schematic diagram of the system of FIG. 1 showing a filling phase of a second bag of the second row of the cartridge with the first filled bag sealed and removed from the cartridge.

In the next phase shown in FIG. 14, the bags 26 of the first row 66A are separated from the grid 56, and the fill valves 160 engage the stems 54 of the bags 26 of a second row 66B. The first supply and return manifold valves 146A, 150A close, and second supply and return manifold valves 146B, 150B coupled to the second row 66B open. The second pump 44 pumps solution from the reservoir 38, through the supply line 110 and a portion of the supply manifold 62, and into a second fill manifold 78B. Consequently, any trapped air in the second fill manifold 78B of the second row 66B is purged through the return line 106 and into the inlet port 94 of the reservoir 38. In FIG. 15, the return manifold valve 150B of the second row 66B closes, the supply manifold valve 146B stays open, and the first fill valve 160A opens to allow solution to fill the first bag 26C of the second row 66B. In FIG. 16, the first bag 26C of the second row 66B is sealed and removed from the grid 56 while a second bag 26D of the second row 66B is filled. The phase of filling, sealing, and cutting is repeated for each remaining bag 26 of the second row 66B until each bag 26 is filled, sealed, and removed from the grid 56. Again, the seal and cut assembly of the machine indexes to a position adjacent to a first bag of the following row 66.

Figure 17:
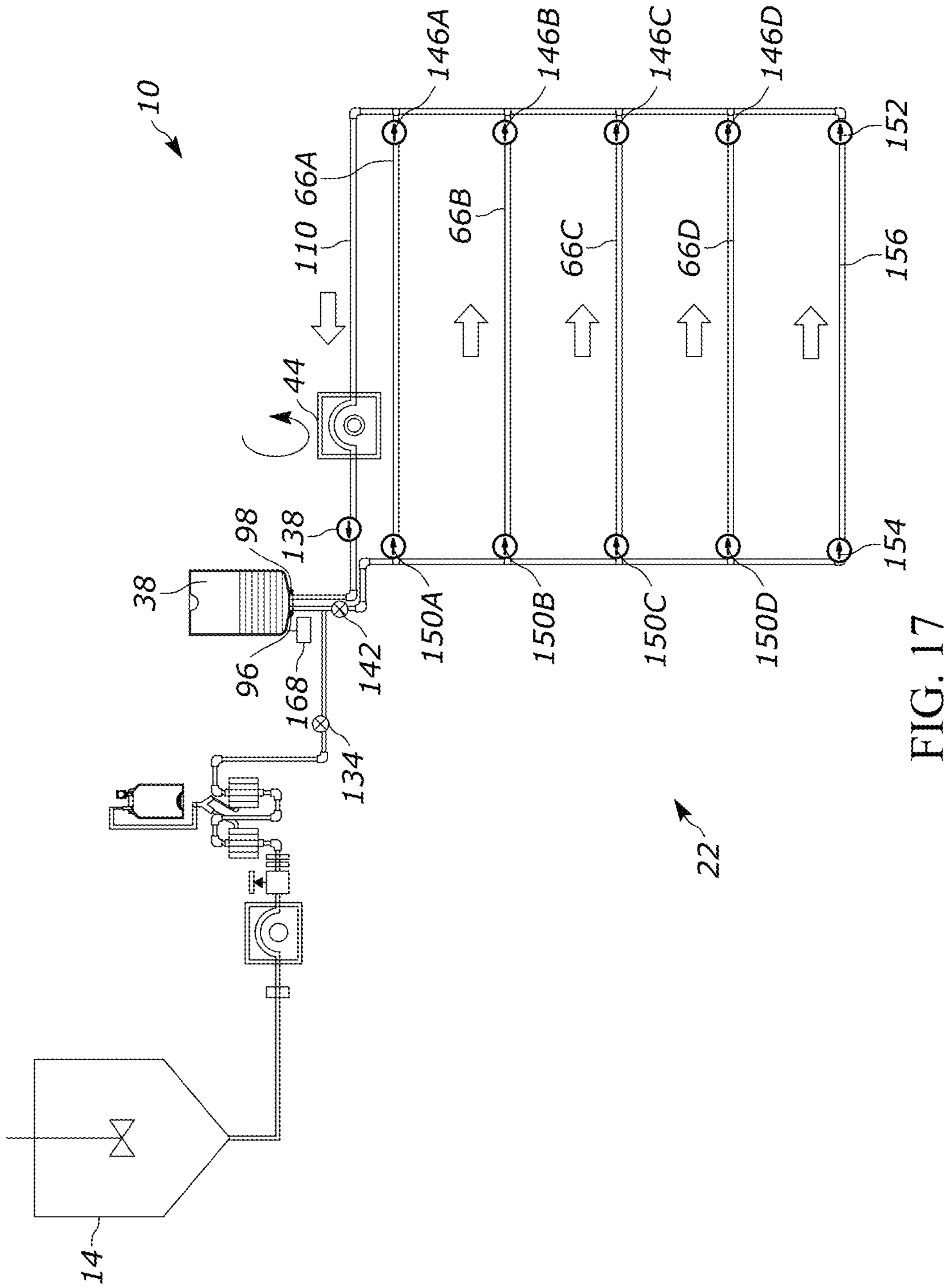
FIG. 17 is a schematic diagram of the system of FIG. 1 showing a solution recapture phase after all of the containers of the cartridge have been filled, sealed, and removed from the cartridge.

Finally, in a last phase of the filling cycle shown in FIG. 17, each bag 26 from the cartridge 22 has been removed and the stems 54 have been sealed to isolate the fill ports of the fill manifolds 78. The supply valve 138, the supply manifold valves 146A-D, 152, and the return manifold valves 150A-D, 154 open, the return valve 142 closes, and the second pump 44 reverses to pull any solution disposed in the grid 56 and deliver the remaining solution through the supply line 110 and into the reservoir 38 through the outlet port 98. The inlet and outlet ports 94, 98 of the reservoir 38 are sealed, and the reservoir 38 is removed from the cartridge 22. A third port 168 of the reservoir 38 may then be connected to the mix tank 14 to transfer the recovered solution back into the mix tank 14.

In summary, the reservoir 38 provides a plurality of roles in the filling cycle of the system 10. First, the reservoir 38 serves as an intermediate bag or volume of solution downstream of the filters 118, 122 for collecting solution used during the wetting stage of the filters 118, 122 of the filter assembly 34. The solution used for wetting the filters 118, 122 in this phase is collected, rather than wasted, and used for filling the product bags 26. Second, the reservoir 38 serves as a volume for trapped air that is purged from the system 10 in the purge phases. As previously mentioned, the reservoir 38 is disposed above the grid 56, thereby receiving the trapped air in its headspace. Third, the reservoir 38 serves as an intermediate solution source for filling the bags 26. Instead of directly drawing from the filter assembly 34, the second pump 44 only draws sterile solution from the reservoir 38. This ensures that filling can be carried out at the desired flow rate without increasing the pressure drop across the filter assembly 34, thereby protecting the integrity of the filters 118, 122. This configuration also helps improve fill accuracy by isolating the second pump 44 from the inherent variability introduced by the filters 118, 122 during its use cycle (as filter pores progressively clog up, the pressure drop for a given flow rate through the filter starts to change which would otherwise negatively impact the fill accuracy of the metering pump positioned upstream relative to the filters 118, 122). Fourth, the reservoir 38 serves to minimize waste of the system 10 by receiving any unused solution (i.e., not delivered to a product bag 26) from the distribution grid 56. After all the solution is pulled back into the reservoir 38, the supply and return ports 94, 98 of the bag 38 are sealed and the bag 38 is disconnected from the distribution grid 56. Using the third port 168 of the reservoir 38, the contents of the reservoir 38 can be returned back to the mix tank 14 safely and without any contamination risk. Finally, and as will be described in more detail below, the amount of solution in the reservoir 38 is monitored closely for active fill management. This is achieved by mounting the reservoir 38 on a load cell, which monitors the exact amount of solution in the reservoir 38 at any time during the fill cycle. Towards the end of the bag fill phase, the control system of the machine actively manages the amount of solution in the reservoir 38 to ensure that reservoir 38 is almost empty when the cycle ends.

Figure 18A:
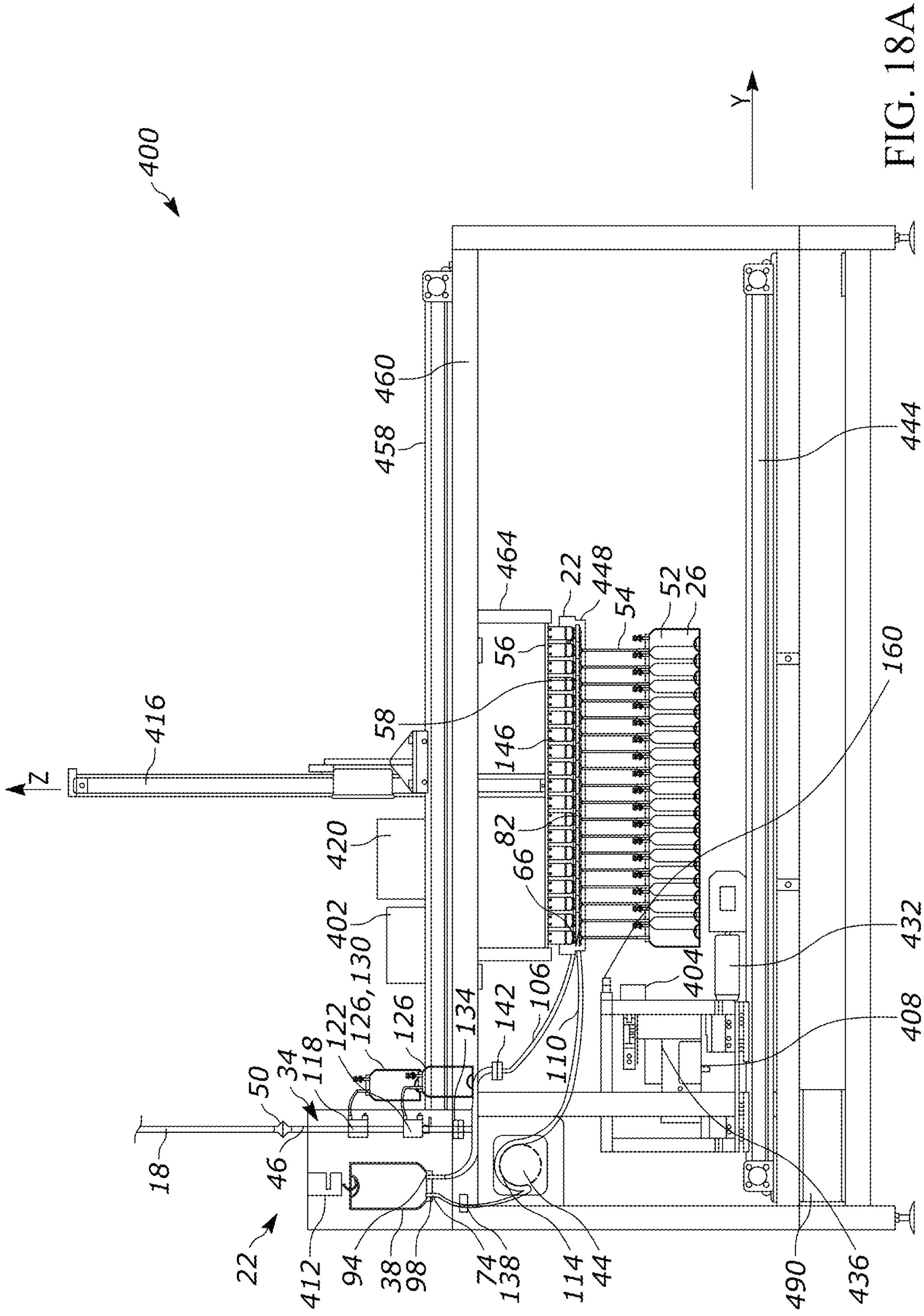
FIG. 18A is a side view of a filling machine used in the system of FIG. 1, and is assembled in accordance with the teachings of the present disclosure.
Figure 18B:
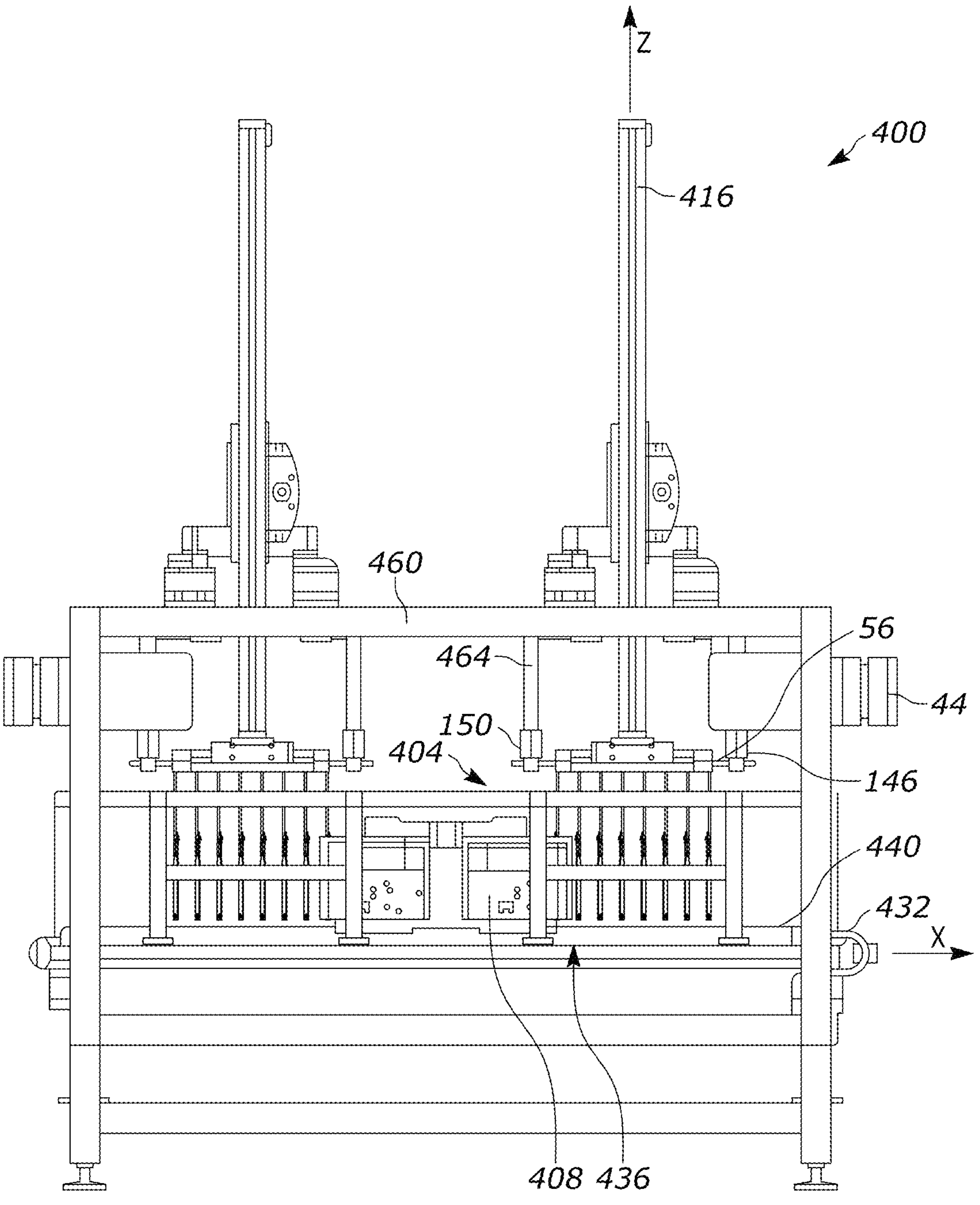
FIG. 18B is a front view of the filling machine of FIG. 18A.
Figure 18C:
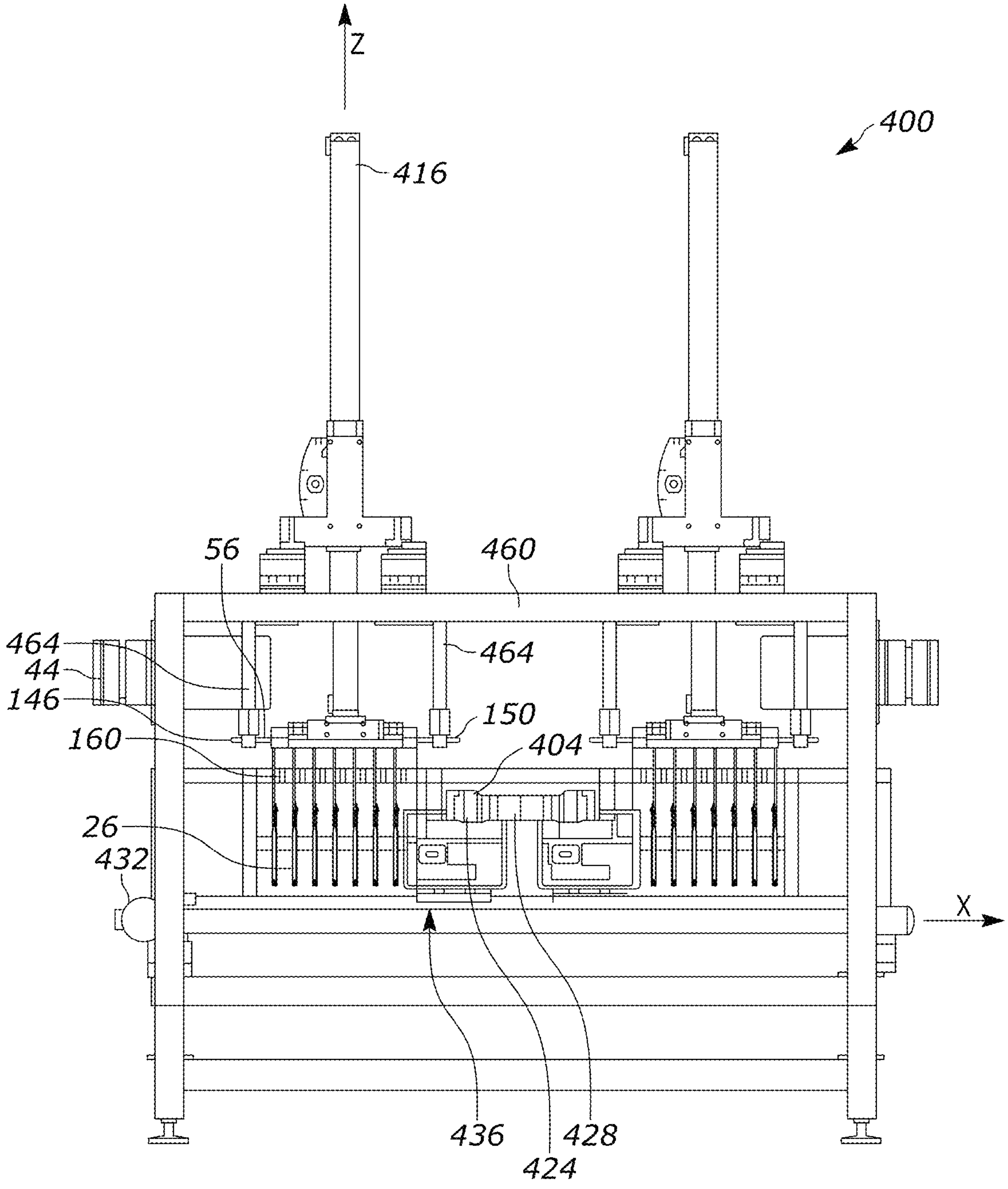
FIG. 18C is a back view of the filling machine of FIG. 18A.

The exemplary system 10 and method of producing sterile solution-filled product bags 26 may be used with a machine, such as the machine 400 in FIGS. 18A-18D. The machine 400 automates many phases of the filling cycle described above by including a programmable logic controller ("PLC") 402, the seal and cut assembly 404, a sealing controller 408, a sealing energy (e.g., an RF generator) 490, a load cell 412 communicatively coupled to the first and second pumps 42, 44, a gantry system 416, the supply and return manifold valves 146, 150, and the fill valves 160. The machine 400 also includes a user interface 420 to display various commands, messages, and status updates, and to operate the PLC 402 of the machine 400. The machine 400 of FIGS. 18A-18D is capable of simultaneously processing two separate cartridges 22, and therefore includes a set of each of the components necessary to process the cartridges (e.g., seal and cut assemblies, pumps, gantry systems, isolation valves, etc.). However, for the sake of simplicity, one set of the machine components will be labeled in the figures. Therefore, it may be presumed that the components of a left side of the machine 400 is identical, and a mirror image of the labeled components of the right side of the machine (as depicted in FIG. 18A).

The on-board PLC 402 of the machine 400 operates and controls various components of the system 10 during the filling process and is configured to interact with an operator by displaying commands, communicating results, providing status updates, and alerting the operator to system or performance errors via the user interface 420. Generally, the PLC 402 includes one or more processors and a memory coupled to the one or more processors and that stores executable instructions for running the fill cycle. The PLC 402 is configured to receive signals from proximity switches and other sensors, transmit commands or signals to actuating devices of the system 10 (e.g., the pumps 42, 44, the seal and cut assembly 404, the first and second groups of valves 146, 150, 160), monitor sensors (e.g., the load cell 412, a sensor in a sealing device), and process information gathered and received from the sensors.

For example, the PLC 402 communicates with a first pump 42 to begin pumping a solution from the mix tank 14 to wet the filter assembly 34, as shown and described above with respect to FIG. 9. The PLC 402 also communicates with the load cell 412 to determine the amount of solution being pumped into the reservoir 38 and subsequently each individual bag 26 of the cartridge 22 as a secondary check. The PLC 402 communicates with the second pump 44 to stop pumping the solution when each of the product bags 26 has been filled to a desired capacity. Additionally, the PLC 402 signals to the second pump 44 to reverse after all the bags 26 have been filled, sealed, and separated from the grid 56, as shown in FIG. 17. Further, the PLC 402 is configured to communicate with each isolation valve 165, 134, 138, 142, 146, 150, 152, 154, 160 (i.e., to open or close) during each phase of the filling cycle 500. In the illustrated example, the PLC 402 controls the operation of the machine 400 locally (e.g., a wired connection) and may be accessed by the user interface 420 of the machine 400. In other embodiments, the PLC 402 may remotely control the operation of the machine 400 via wireless communication systems. Each of the RF generator 490, load cell 412, and peristaltic pumps 42, 44 includes a controller. The PLC communicates with each of the controllers to set up process parameters, send instructions, and receive process data.

The PLC 402 may be programmed to store data for each batch of viable product bags 26 that have been filled and tested for sterility. Before filling, an operator may enter a serial number associated with the cartridge 22 into the PLC 402 via the user interface 420 to store type of solution, solution expiration, filling date and location, fluid conductivity and integrity results, and other information pertaining to the product bags 26. In other examples, each batch of filled product bags 26 may be serialized by other means with or without the use of the PLC 402. For example, the bags 26 may be labeled before or after the bags 26 are filled. If both filters 118, 122 of the cartridge 22 fail, then each of the corresponding bags 26 may be segregated out for discard.

Figure 18D:
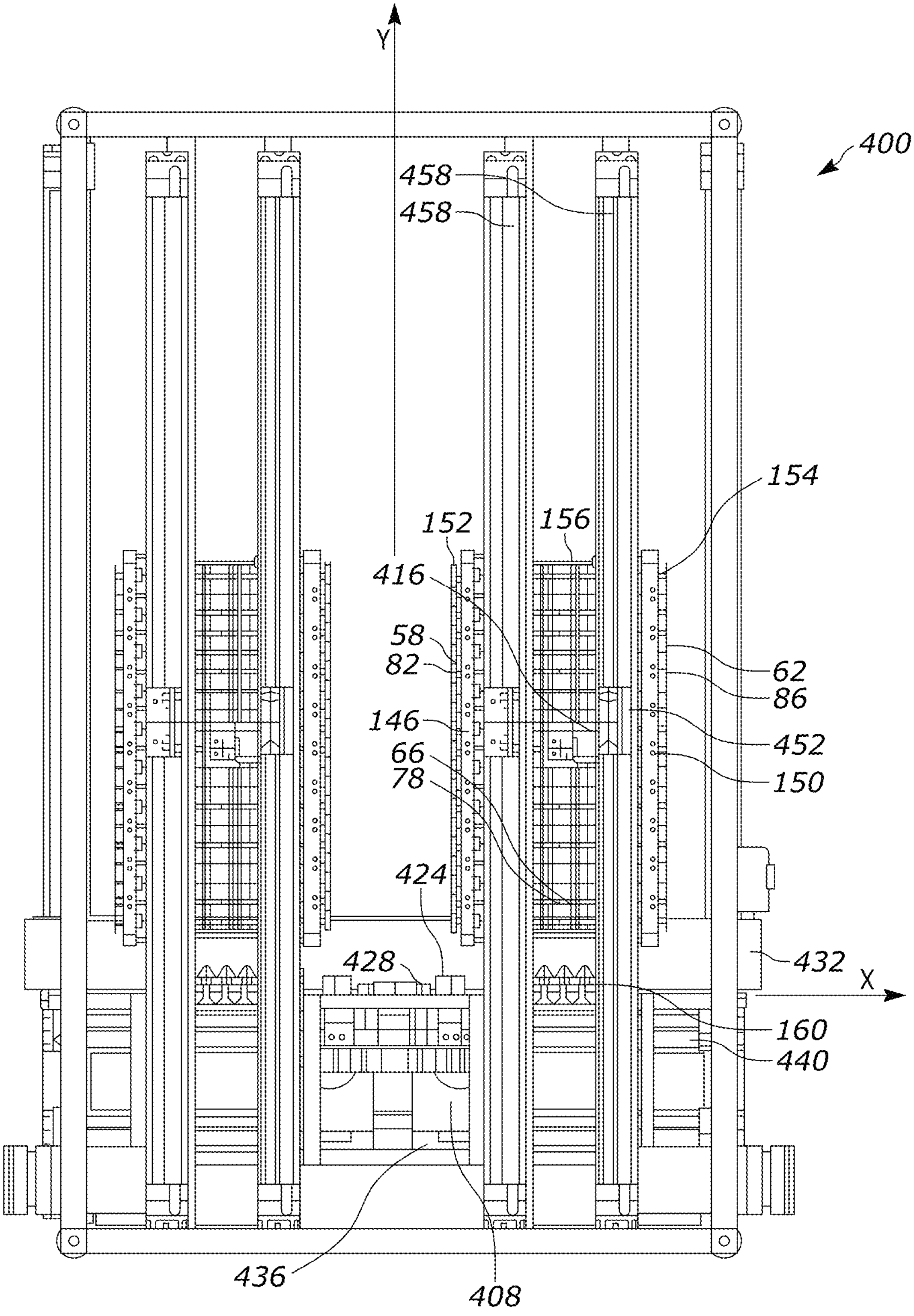
FIG. 18D is a top view of the filling machine of FIG. 18A.
Figure 21:
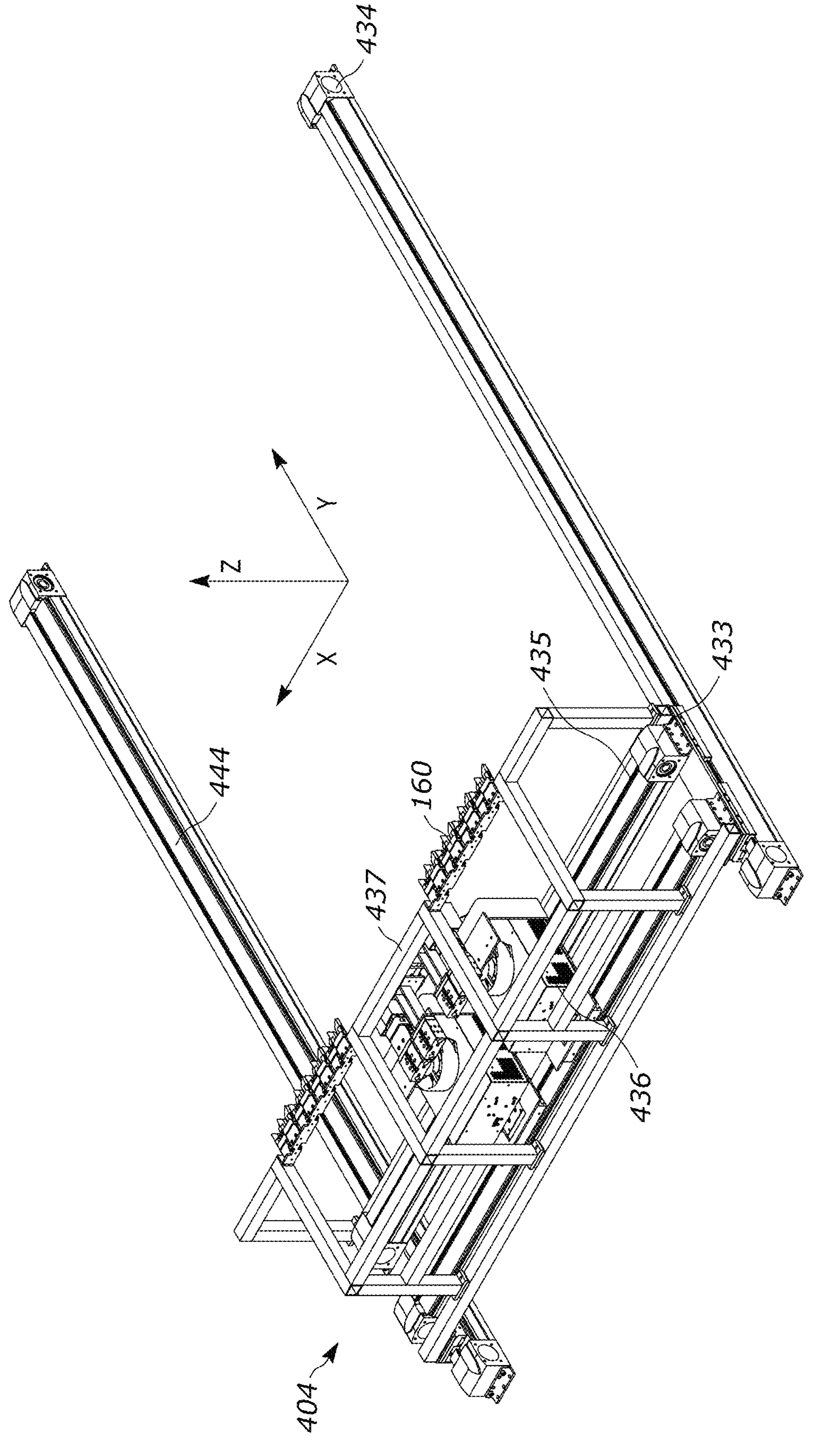
FIG. 21 is a front perspective view of a seal and cut assembly of the filling machine of FIGS. 18A-18D.
Figure 22:
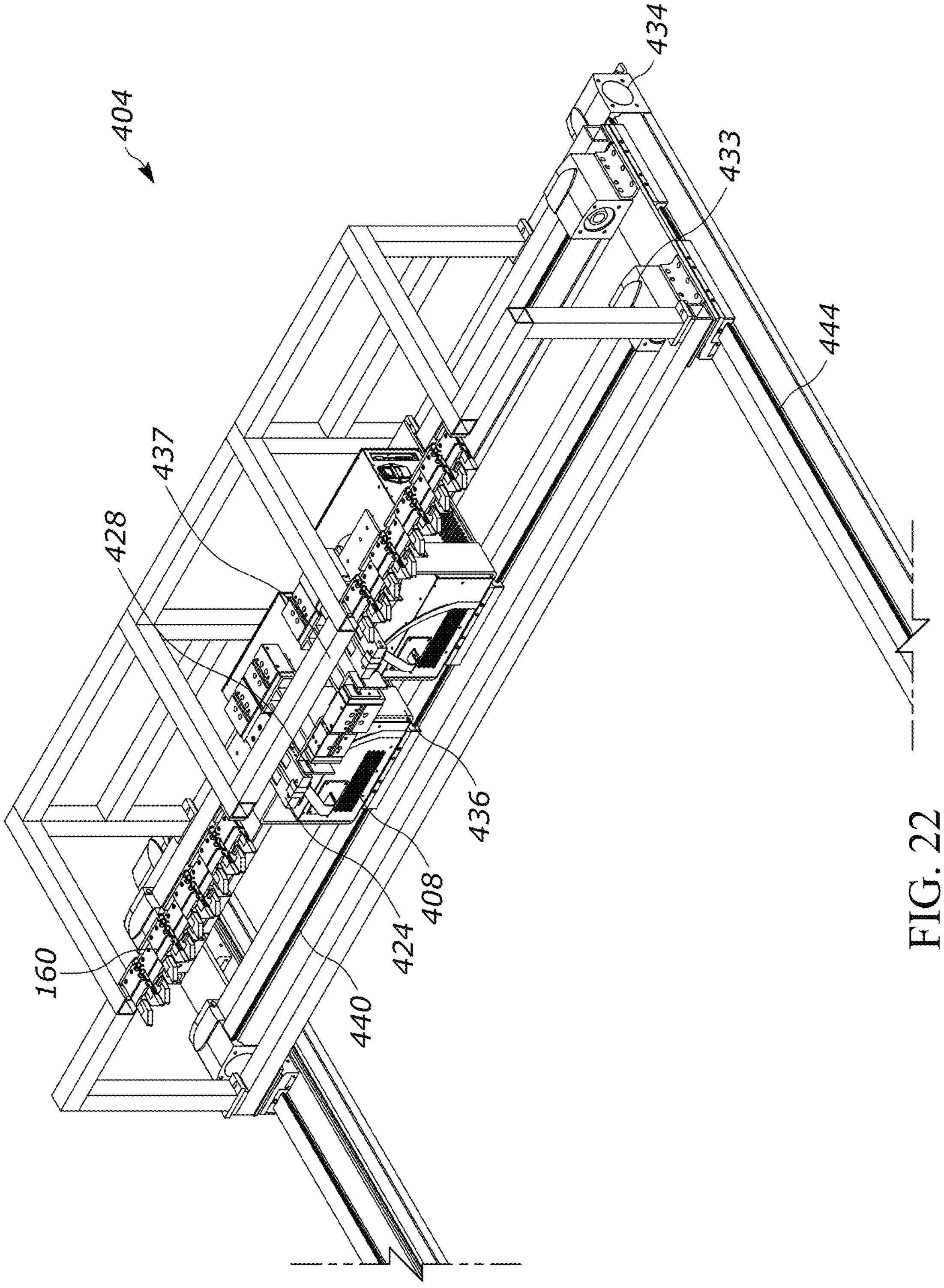
FIG. 22 is a back perspective view of the seal and cut assembly of FIG. 21.

The seal and cut assembly 404, shown in FIGS. 18D, 21, and 22, includes the sealing controller 408, the sealing energy (e.g., an RF generator) 490, a sealer 424, a cutter 428, a conveyor 432 (not illustrated in FIGS. 21 and 22) disposed below the sealer 424 and cutter 428, one or more sensors, and a carriage 436 carrying the sealer 424 and cutter 428. The seal and cut assembly 404 is servo-controlled using linear transfer units 433, 434 to move in directions parallel to respective X and Y axes of the machine 400. For example, the X-direction linear transfer unit 433 moves the two carriages 436 of the two seal and cut assemblies 404 in the X-direction. The linear transfer unit 433 includes two independently driven linear drive units. Each carriage 436 is coupled to only one linear drive unit, but uses the guide rail of the other linear drive unit for support via a floating linear bearing mounted on the guide rail of the other linear drive unit. Thus, each of the two seal and cut heads may be driven independently and may also adequately support the two sealing control units 408 attached to the two seal and cut assemblies 404. The linear transfer unit 434 moves the two seal and cut assemblies 404 and the two valve assemblies 160 in the Y-direction. In one example, the transfer unit 434 includes of two linear drive units coupled via a coupling shaft connected to a single servo motor.

To seal and cut each stem 54 of the plurality of bags 26 of a row 66, the carriage 436 moves the sealer 424 and the cutter 428 along the X axis. The carriage 436 moves to programmed positions to align the sealer 424 and cutter 428 with the stems 54 of the plurality of bags 26. The sealer 424 and the cutter 428 are spaced from each other the same or similar distance between adjacent stems 54 in a given row 66. In this way, the sealer 424 is in position to seal one stem 54 and the cutter 428 is in position to cut the adjacent sealed stem 54. After a seal and a cut have been made, the carriage 436 moves the sealer 424 and cutter 428 to the next position to seal and cut the stems 54 until all bags 26 of one row 66 are removed from the cartridge 22. After the last bag 26 of the row 66 has been cut from the cartridge 22, the seal and cut assembly 404 and valves 160 mounted on the transfer unit 434 move along or parallel to the Y axis In some examples, a chute may be disposed below the sealer 424 and cutter 428 to direct bags 26 separated from the cartridge 22 onto the conveyor 432. The chute is coupled to the seal and cut unit whereas the conveyor 432 is mounted directly to the linear transfer unit 433. As a seal and cut assembly 404 positions itself for a bag 26, the chute is in the correct position to direct the separated bag 26 onto the conveyor 432. When the linear transfer unit 433, carrying the seal and cut assemblies 404 and the valves 160, advances to a row, the conveyor 432 advances with it and therefore is positioned correctly to receive bags separated from the cartridge 22.

Separately, the sealer 424 and the cutter 428 are also pneumatically controlled to move relative to the carriage 436 when performing their respective seal and cut functions. For example, after a bag 26 is filled and the fill valve 160 engages the stem 54, the sealer 424 extends in the Y direction, away from the carriage 436, to engage the stem 54 and create a seal. After a seal is determined to be satisfactory, which is described in more detail below, the sealer 424 retracts back to the carriage 436. The carriage then indexes in the X direction and the sealer 424 again extends in the Y direction to seal a second stem 54, and the cutter 428 extends in the Y direction, away from the carriage 436, to cut the first sealed stem 54. After the cutter 428 cuts the first stem 54 and the sealer 424 seals the second stem 54, both the sealer 424 and the cutter 428 return back to the carriage 436 before the carriage 436 moves again in the X direction to process the next bag 26. In another example, however, the sealer 424 and cutter 428 do not engage different stems 54 of adjacent bags 26 simultaneously. Rather, the sealer 424 extends to seal one stem 54, retracts after the stem 54 is adequately sealed, and then the carriage 436 advances to position the cutter 428 in front of the stem 54 before the cutter 428 extends to cut the stem 54.

To make a seal, the sealer 424 of the seal and cut assembly 404 extends toward the stem 54 of the bag 26 in an open position and clamps onto the stem 54 once in place. The sealing tool 424 is connected to a radiofrequency ("RF") generator by way of the controller 408. The sealer emits RF energy between opposing clamped surfaces to heat the polymer of the stem 54, causing the stem 54 to melt sufficiently, bond, and form a seal. The sealing tool 424 forms a sufficiently wide seal to allow adequate welded length on each end after bag 26 has been cut away. The sealed portion of the tube is cut into two sections where the upper section remains with the cartridge 22 and the lower section becomes part of the bag 26. The width of the seal may depend on the properties of the tubing of the stem 54 to ensure that the seal withstands a squeeze test on the bag for at least ten seconds at 20 psi. The cutter 428 is arranged to cut at or near a midpoint of the width of the seal to create two sealed ends (i.e., a sealed end of the stem 54 connected to the bag 26 and a sealed end of the upper section of the stem 54 remaining with the cartridge 22) so that the cartridge 22 is maintained in a closed state.

The sealing tool 424 is electrically coupled to the sealing controller 408, which in turn is linked to the RF generator 490 associated with the sealer 424. The RF generator is in communication with the PLC 402 so that the PLC 402 of the machine 400 can control and/or monitor the adequacy of the seal. The sensors of the seal and cut assembly 404 are arranged to measure incident and reflected power. The sealing controller 408 controls delivery of the power to the sealing jaws during the weld cycle to prevent over seals or under seals. A memory linked to the PLC 402 stores executable instructions that, when executed by the PLC 402, causes the one or more processors to receive data captured by the RF generator and analyze the data to identify a status or a condition associated with the seal created by the sealer 424 to signal the machine 400 to accept or reject the seal. The sealing controller 408 can sense a direct short and the RF generator 490 can sense amount of incident (forward) energy and the reflected energy during sealing.

Prior to running the machine 400, the PLC 402 may be set up to establish an acceptable average weld power range (i.e., average power over the duration of the weld) for the fill tube weld. During the sealing operation, the PLC 402 compares real-time weld data captured by the RF generator with the acceptable average weld power range stored in the memory. Based on this comparison, the PLC 402 makes one of the following determinations of (1) accepting the seal, (2) rejecting the seal, or (3) signaling to the sealing tool 424 to re-seal the stem 54. For example, the seal is accepted when an average weld power is within the stored acceptable weld range, or the seal is rejected when the average weld power is less than a lower limit of the acceptable average weld range or if a short circuit is detected in the clamp of the sealer 424.

If captured average weld power is less than the lower limit of the acceptable average weld range, the machine 400 will automatically attempt a re-seal provided the maximum number of sealing attempts has not been reached. Specifically, the PLC 402 makes such a determination and communicates with the sealing tool 424 so that the filling cycle does not continue until the stem 54 is re-sealed. If the captured average weld power is greater than the upper limit of the acceptable weld power range, it indicates an over-seal. In this example, the clamp of the sealer 424 is kept closed around the stem 54 and the operator is instructed to manually seal the stem 54 and remove the bag 26 from the cartridge 22. The machine 400 is equipped with a second manual hand-held sealer and cutter in addition to the primary automated sealer 424. If a short is detected at the sealing clamp, the sealing controller 408 immediately cuts off power to the sealing clamp and the sealing clamp remains in the closed position. The machine 400 then prompts the operator to manually seal and remove the bag 26. When a seal is rejected, the machine 400 advances to the next bag 26 in the cartridge 22 only after the remedial steps have been completed successfully. Sealing data for every bag 26 is recorded and stored in a secure database and is reported for the purposes of batch release.

The PLC 402 also communicates with the load cell 412 to monitor the amount of solution running through the system 10 for filling the plurality of bags 26 to avoid unnecessary waste. As previously mentioned, the reservoir 38 is mounted on the load cell 412, which monitors the exact amount of solution in the reservoir 38 at any time during the fill cycle. At different phases of the fill cycle, the load cell 412 will communicate with the PLC 402 and the first pump 42 to add more solution to the reservoir 38. Towards the end of the fill cycle, the PLC 402 actively manages the amount of solution in the reservoir 38 to ensure that reservoir 38 is almost empty when the cartridge 22 is completely filled. After all bags 26 of the cartridge 22 have been filled, the PLC 402 registers the weight input from the load cell 412 before reversing the direction of the second pump 44 to recover the solution from the filled cartridge, as described in connection with FIG. 17. After the end of the recovery cycle, the PLC 402 again registers the weight of the reservoir 38. The weight of the recovered solution is calculated from the initial and final weights of the reservoir 38 measured by PLC 402, which then uses the data to compare with the historical average. A lower-than-average recovered weight may indicate a leak in cartridge 22.

Figure 19:
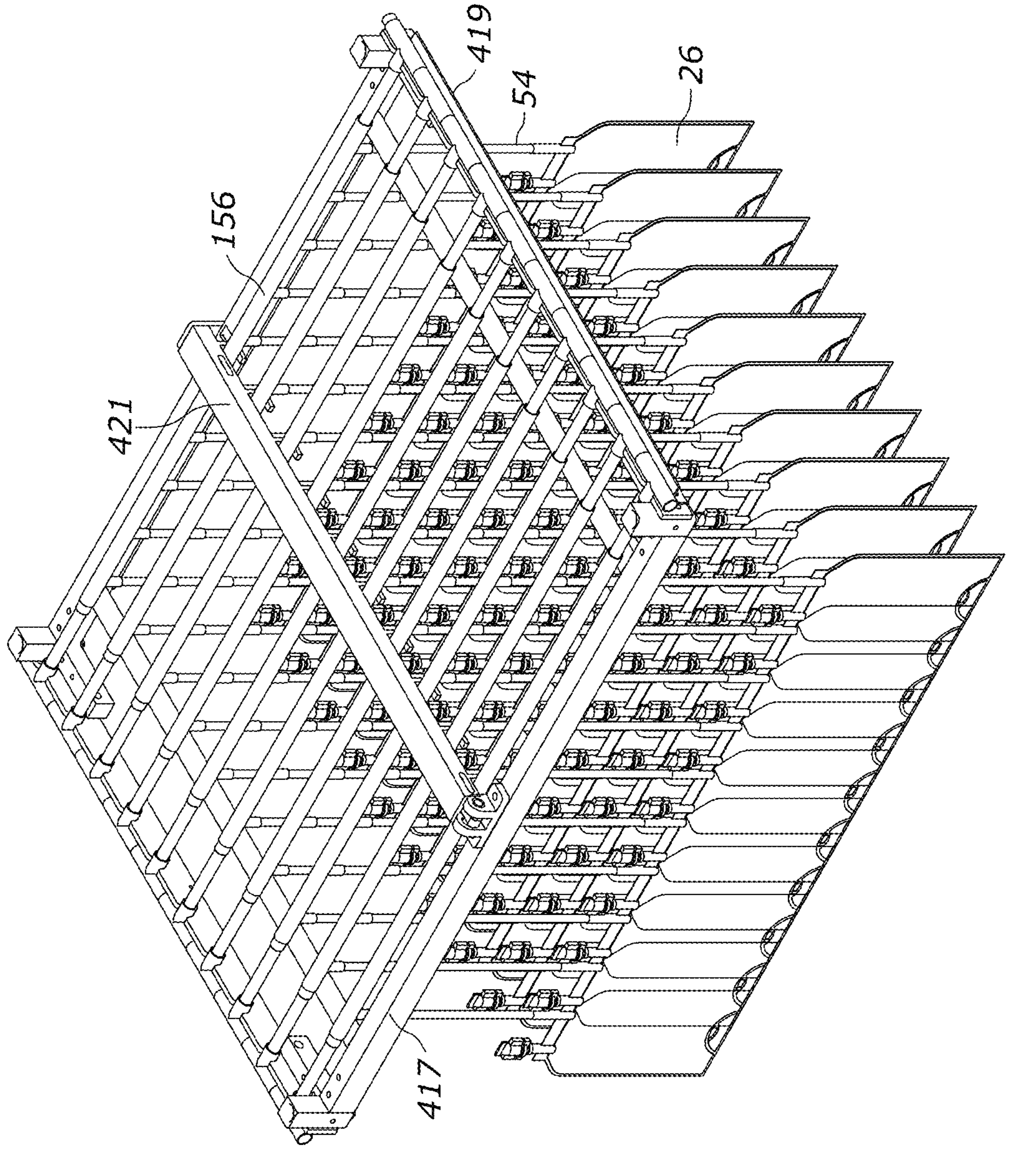
FIG. 19 is a perspective view of a tray assembly for use with the filling machine of FIGS. 18A-18D.
Figure 20:
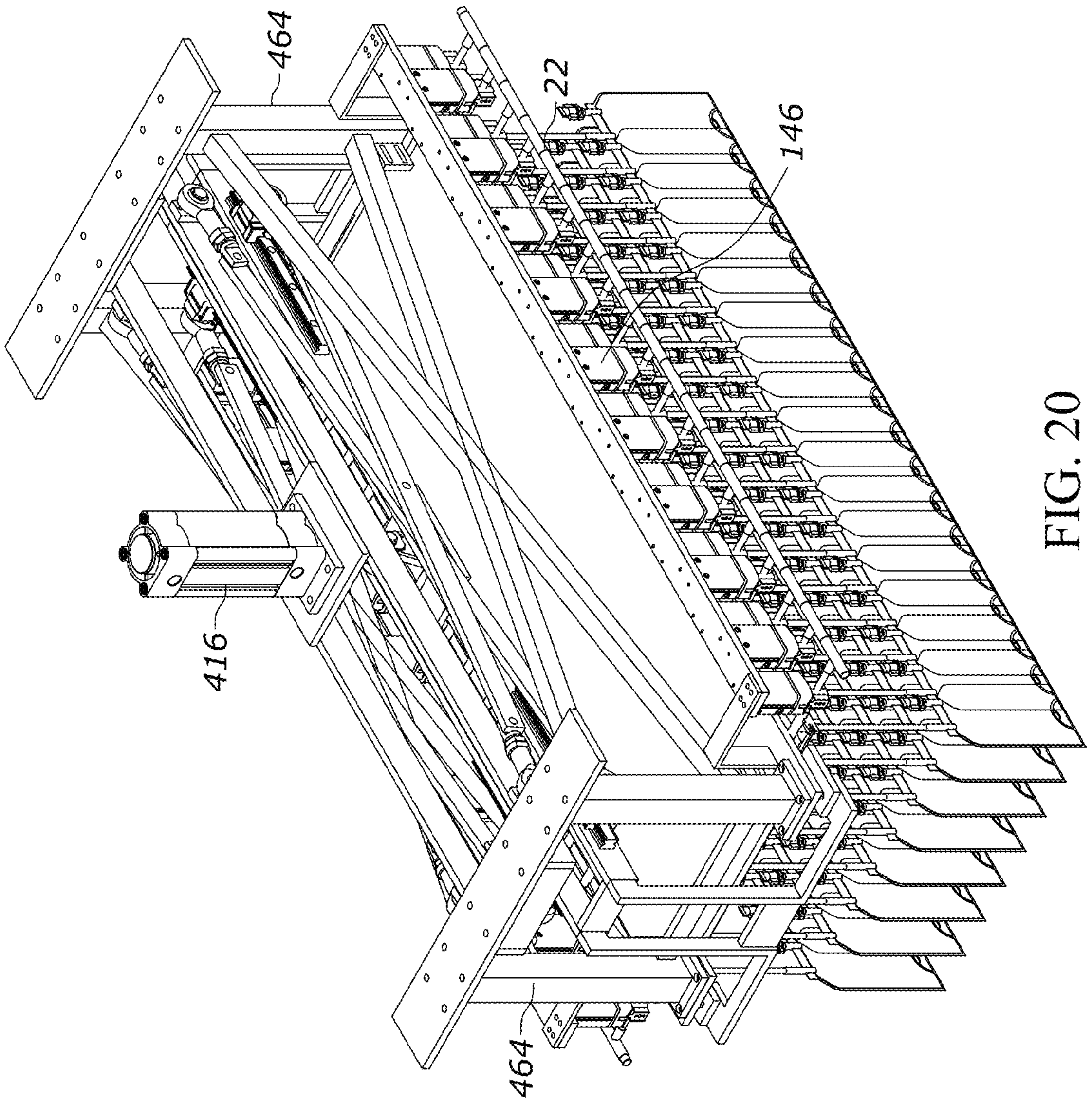
FIG. 20 is a perspective view of a gantry system of the filling machine of FIGS. 18A-18D, holding the tray assembly of FIG. 19.

The gantry system 416 is a movable gripper configured to receive and position a cartridge 22 relative to the machine 400 for the filling cycle. In FIG. 19, a tray 417 carrying a cartridge 22 is illustrated. The tray 417 is a support structure that secures the cartridge 22 to the gantry system 416, and includes a frame 419 supporting the grid 56 of the cartridge 22 and a rotatable swing arm 421. In the illustrated example, the frame 419 includes slots or grooves shaped to hold each row 66 of the cartridge. In FIG. 19, the swing arm 421 is in a closed position and is disposed on top of the tubing of each row 66, thereby clamping the cartridge 22 to the tray 417. In FIG. 20, the tray capture mechanism of the gantry system 416 is illustrated holding the tray 417 and cartridge 22 of FIG. 19. The gantry system 416 securely receives and couples to the tray 417, and positions the supply end 58 and return end 62 of each row 66 with the corresponding supply and return manifold valves 146, 150. In FIG. 18D, the gantry system 416 is configured to receive the tray 417 from the end of the machine 400 and position the tray 417 adjacent to the seal and cut assembly 404.

As previously discussed, the supply and manifold valves 146, 150 form two columns, where each column is adjacent to an opposite end of each row 66 of the cartridge 22. The supply and manifold valves 146, 150 are suspended from a top rack 460 of the machine 400 by suspension rods 464. When the cartridge 22 is loaded to the machine 400, the cartridge 22 is not necessarily in proper position for interacting with the isolation valves 146, 150, 160. Therefore, to set up the cartridge 22 in the proper place for the filling cycle, the gantry system 416 moves the cartridge 22 in a direction parallel to the Z axis to meet the stationary isolation valves 146, 150, 160 of the machine 402.

The illustrated exemplary machine 400 is a fully automated machine with automated loading and unloading of cartridges 22, filling, sealing, and cutting. However, other mechanisms and arrangements of the machine 400 may be used to carry out each phase of the machine cycle. For example, the movement of the gantry system 416 may be facilitated by an operator by sliding the gantry system 416 into place along the rails 458 of the machine 400 and into position. In yet another example, the seal and cut operations of each bag 26 may be semi-automated or completely manual. Other sealing technologies may also be used, such as, for example, thermal heat transfer, ultrasonic welding, or other suitable methods based on the material of the tube 54.

Figure 24:
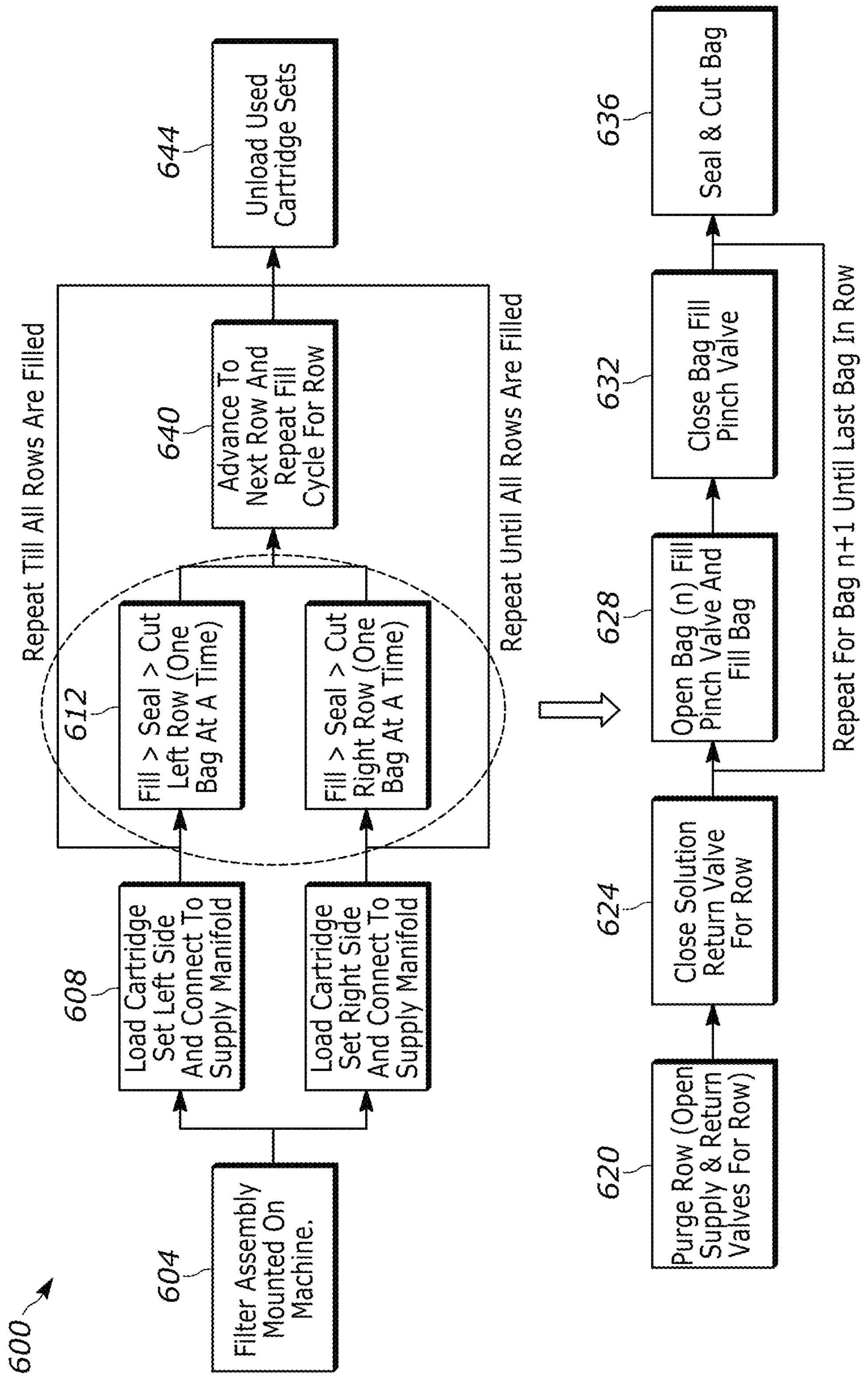
FIG. 24 is a flow diagram of a second exemplary method of filling a plurality of containers with sterile solution in accordance with the teachings of the present disclosure.

Turning now to FIG. 24, a method 600 of filling a plurality of product bags 26 using the machine 400 is described with respect to a multi-cartridge batch of FIG. 25 and with reference to the fill operation steps described in FIGS. 9-17. FIG. 25 is a schematic diagram of an example system 610 for filling a plurality of containers of the multi-cartridge batch with a sterile solution. The system 610 is similar to the system 10 of FIG. 1 described above, with similar reference numbers (although increased by 600) for similar components, but includes a different filter assembly 634 and cartridge arrangement. It will be appreciated that the system 610 of FIG. 25 operates in a slightly different manner than the system 10 of FIG. 1.

The system 610 of FIG. 25 is arranged to deliver a solution from a solution source, for example a mix tank 614, to a plurality of containers through a filter assembly 634 and into the multi-cartridge connection and solution distribution grid 611. An aseptic connector 651 of a feed line 618 is arranged to connect to a corresponding aseptic connector 653 coupled to the filter assembly 634. The endotoxin filter 630 is connected upstream of the first fill pump 642 in the feedline 618. The filter assembly 634 includes a first sterilizing grade filter 619 and a final sterilizing grade filter 622. Each filter 619, 622 is coupled to a sample bag 726, 730, respectively. The sample bags 726, 730 are used to receive purged air disposed in the feedline 618 and filter 619. Additionally, the sample bag 726 may receive solution from the feedline 618, and the sample bag 730 may receive solution passing through the first filter 619, which can be monitored to ensure suitable performance and/or tested to determine the effectiveness of the filter 619. The first and last filled bags from the cartridge are tested to verify effectiveness of the second filter 622.

Unlike the first system 10, the system 610 includes the multi-cartridge connection and solution distribution grid 611 providing a manifold 613 downstream from the filter assembly 634 with several aseptic connectors arranged to aseptically connect to one or more cartridges 622A, 622B. The solution distribution grid 611 and filter set 634 are part of the same assembly and are sterilized together. In the illustrated example, the manifold 613 includes twenty separate lines 615, which may be flexible silicon tubing, arranged to connect the manifold 613 to twenty different aseptic connectors 650, which may be, for example, AseptikQuik®

Sterile Connector. The filter set 634 includes two filters 619, 622 (e.g., both sterilizing grade filters) and the manifold 613 containing several male/female/genderless ends of aseptic connectors 650A, 650B. The other male/female/genderless aseptic connector ends 650A-A-650 B-B are attached to each one of the cartridges 622A, 622B that need to be filled. In the schematic, only two cartridges 622A, 622B are illustrated. A first connector 650A is arranged to connect a first connection line 646A to the first cartridge 622A, for example, and a second connector 650B is arranged to connect a second connection line 646B to the second cartridge 622B. However, the solution distribution grid 611 may include an aseptic connector for every cartridge that requires filling in a batch.

In the illustrated example, one or more pinch valves may be arranged to clamp on the manifold lines 613 to control fluid flow into the cartridges 622A, 622B. For example, a pinch valve adjacent to the line 615A may be open to permit fluid to flow from the manifold 613 and into the first line 615A to begin filling the first cartridge 622A. Meanwhile, a pinch valve adjacent to the line 615B may be closed to prevent fluid from flowing into the second cartridge 622B. At an end of the manifold 613, opposite the filter assembly 634, a reservoir 619 is in fluid communication with the manifold 613 to receive purged air from the manifold 613. In other examples, the manifold 613 may be arranged to have more or fewer connectors 650 than illustrated, and/or may be arranged so that only a fraction of the twenty connectors 650 are coupled to cartridges 622A, 622B, as shown in FIG. 25.

Similar to the first system 10, a first pump 642 is coupled to the feed line 618 to pump solution from the fluid source 614 through the feed line 618 and into the filter assembly 634. Each cartridge 622A, 622B coupled to the manifold 613 is separately coupled to a second pump (e.g., a peristaltic pump) arranged to interact with a tubing portion 714A, 714B of each respective supply line 710A, 710B. The multi-pump configuration separates the pumping operation of the system 710: the first pump 642 draws fluid from the mix tank 614 for delivery to the manifold 613, and the second pump accurately pumps fluid from a reservoir 638A, 638B into the containers 626A, 626B of each cartridge 622A, 622B.

The machine 400 assures production of sterile solution-filled product bags 626 by performing a plurality of steps of the method 600. In this method 600, the filter set 634 is loaded in the machine 400 separately from the cartridges 622A, 622B. After both the cartridges 622A, 622B and the filter set 634 are loaded, the operator connects the two ends of the aseptic connectors 650, one first end connected to the manifold 613 and the other end connected to the cartridge 622. Once connected the filling operation proceeds as described previously. At the end of filling and after solution recovery, the connecting line 646 is sealed and then cut into two sections, one section remaining with the used aseptic connector on the filter set 634 and the other section remaining with the used cartridge 622. The used cartridge is removed and replaced with a new cartridge but the filter set 634 remains on the machine. When a new cartridge 622 is loaded, the aseptic connector end of the cartridge 622 is connected with one of the unused aseptic connectors from the filter set connector manifold. This ensures a sterile fill for all cartridges 622.

For the first two cartridges in a batch 622A and 622B, after the aseptic connector ends 650A and 650A-A and connector ends 650B and 650B-B are connected, the filling cycle begins, as previously described, by activating the first pump 642 to purge the feed line 618. The main isolation valve 765 closes and air is vented through vent 764. Next, the main isolation valve 765 opens to wet the filters 630, 722 of the filter assembly 634, and to fill the reservoirs 638A and 638B. Then, air trapped in each grid 656A, 656B is purged by closing a main feed valve 734A, 734B, and opening a supply valve 738A, 738B (FIG. 25), the supply manifold valve 152, the return manifold valve 154, and the return valve 142, as shown in FIG. 10. To fill the plurality of bags 626A, 626B in step 612, multiple steps are performed by the machine 400 and step 612 is repeated for all rows 666 for each solution distribution grid 656A, 656B of the cartridges 622A and 622B. In other words, the method steps 620-636 are performed for each row 666A, 666B before advancing to the next row 666 and repeating the fill cycle of step 612. For ease of reference, the steps performed on each grid 656A, 656B will be described with reference to the first exemplary cartridge 22 and system 10 of FIGS. 1, 7-19.

In step 620, trapped air from a first row 66A is purged through the connection line 46 of the cartridge 22 before filling the first bladder 52 of bag 26, as shown in FIG. 11. When purging the first row 66A of the connection line 46, the machine 400 opens a first row supply manifold valve 146A and a first row return manifold valve 150A. Because the first end 70 of the supply manifold 78A of the first row 66A is coupled to the first row supply manifold valve 146A and the second end 74 is coupled to the first row return manifold valve 150A, air and solution may flow through the entire fill manifold 78A of the first row 66A. However, solution does not enter the bladders 52 of each bag 26 because the isolation valves 160 coupled to the stems 54 are closed. To purge air from the fill manifold of row 66, a pre-validated volume of solution is pumped by the pump 44 through the fill manifold back to the reservoir 38 disposed at least partially above the connection line 46. This pushes the air out from the fill manifold of row 66 into the reservoir 38. The pump 44 communicates with the PLC 402 to close the return manifold valve 150A of the first row 66A in step 620, as shown in FIG. 12. This is repeated for each subsequent row 66 after all bags in the previous row have been filled sealed and removed by cutting. This is done by operating the supply and return manifold valves 146, 150 corresponding to each row 66.

Immediately after closing the return manifold valve 150A, the first fill valve 160A coupled to the stem 54 of the first bag 26A opens to allow solution into the bladder 52 of the first bag 26A. The load cell 412 monitors the reservoir 638 to ensure there is enough volume in the reservoir 38 to begin the purging/filling process. The second pump 44 meters the desired volume of solution into each of the product bags 26. As filling proceeds, the load cell 412 will control the first pump 42 transferring fluid from the mix tank 14 through the filter assembly 634 to the reservoir 638 so that there will be sufficient solution for the filling process to proceed. As the filling process is about to conclude, the load cell 412 aims for minimal remaining volume in the reservoir 638.

When the first bag 26A is filled, the first fill valve 160A closes to isolate the filled bladder 52 of the first bag 26A. Shortly thereafter, step 628 is repeated for the second bag 26B of the first row 66A. Specifically, the second bag 26B of the first row 66A is filled after opening a fill valve 160B coupled to a stem 54 of the second bag 26B and closing the fill valve 160A coupled to the stem 54 of the first bag 26A. While the second bag 26B is being filled, step 636 of sealing and cutting the first bag 26A is performed and the first bag 26 is removed from the cartridge 22, as shown in FIG. 13.

The step 636 of sealing and cutting the bag 26 in step 636 includes running a program of the one or more processors of the PLC 402. The stored program is executed by the PLC 402 by instructing the seal and cut assembly 404 to seal the stem 54 of the first bag 26A with the sealing device 424. This includes moving the sealing device 424 towards the stem 54 and clamping the stem 54, at a location beneath the fill valve 160A and above the bladder 52, to RF seal the stem 54. The RF generator captures sealing power data associated with a seal of the stem 54, and the one or more processors of the PLC 402 analyzes the power data (incident or forward power and the reflected power) associated with the seal. For example, the one or more processors of the PLC 402 compares the captured data with the stored data related to a good seal, and then identifies, based on an analysis of the data, a status or condition associated with the seal. The machine 404 will then either (1) accept the seal if an average weld power, analyzed by the one or more processors of the PLC 402, is within a stored acceptable weld power range, (2) reject the seal if an average weld power, analyzed by the one or more processors of the PLC 402, is less than a lower limit of a stored acceptable weld power range; (3) reject the seal if a short circuit is detected in the sealer 424 by RF control 408; or (4) reject the seal if the average weld power, analyzed by the one or more processors of the PLC 402, is greater than an upper limit of a stored acceptable weld power range. If the seal is rejected, the PLC 402 signals to the sealing device 424 to re-seal the stem 54 provided the maximum number of validated re-seals allowed have not been exceeded. If the seal is accepted, then the sealing device 424 moves away from the stem 54 and the cutting tool 428 moves toward the seal and cuts the stem 54 at the seal into two sections to separate the bag 26A from the fill manifold 78A, as shown in FIG. 13. This may include, as described above, moving the seal and cut assembly 404 in a lateral direction from the first bag 26A of the first row 66A to the second bag 26B of the first row 66A. However, if the seal is rejected (either after a re-seal or because of a short circuit), the PLC 402 will create an alert and display the error on the user interface 420, instructing an operator to manually seal the stem 54 and cut the bag 26 from the cartridge 22.

Steps 628 and 632 of the method 600 are repeated to fill, seal, and cut each bag 26 from the first row 66A. Step 640 of moving to the next row 66 is executed by indexing the seal and cut assembly 404 in the lateral direction (along the X axis of the machine 400) to return to its initial position adjacent to the stem 54 of the first bag 26A, and then in a longitudinal direction (along the Y axis of the machine 400) from the first row 66A toward a second row 66B. After step 640 is complete, steps 620 and 624 are executed for the second row 66B before steps 628, 632, and 636 are executed to fill, seal, and cut each bag 26 of the second row 66B, as shown in FIGS. 14-16. This cycle is repeated for each row 66 of the solution distribution grid 56 until all bags 26 are removed from the grid 56, as shown in FIG. 17. At this point, the PLC 402 instructs the second pump 44 to reverse, the return valve 142 to close, and the return and supply manifold valves 156, 154, 152, 146 to open for purging the grid 56 of any remaining solution in the supply and return manifolds 58, 62 and fill manifolds 78 of each row 66. The solution is pushed into the reservoir 38.

Finally, step 644 includes decoupling the cartridge 622 from the filling machine 400 and coupling a different cartridge 622 to the filling machine 400 to repeat the filling cycle. The different cartridge being the same or similar than the previously filled cartridge, and the PLC 402 may be run on a different program depending on the size and number of bags 26 of the cartridge 622. The filter set assembly 634 remains on the machine 400.

In the method 600, after the last cartridge 622 in a given batch has been filled, to ensure sterility of the contents of the product bag 26, the filter assembly 34 is sealed off and separated from the connection line 646 of the last cartridge 622 for testing in a filter integrity test machine or device. In case when the filter assembly 34 is integrated with the cartridge 22, the filter assembly 34 is sealed and separated from the used cartridge(s) to check for filter integrity. Both filters 118, 122 from the filter assembly 34 are tested to determine, with a high degree of certainty, that the solution of the filled product bags 26 is sufficiently sterile. Even if one of the filters 118, 122 of the filter assembly 634 fails and the other does not, the solution in bags 26 will be sterile. It is also possible to test only one of the filters and test the other one only if the first one fails the filter integrity test.

The filter testing device may be pre-programmed or controlled to perform a filter integrity test, such as a bubble test, a pressure degradation test, water intrusion test, a water flow test, or any suitable test known in the art. A pressure degradation test is a method for testing the quality of a filter either before or after the filter has been used. To perform the integrity test, a test head of the filter testing device engages the inlet of the filter assembly 34. The filter integrity test determines the presence of any structural flaws in the filter membrane that may prevent the filter 118, 122 from adequately sterilizing a solution. For example, a hole having a diameter larger than 0.2 microns (μm) in the filter membrane may allow particulates, viable or no-viable, in the fluid, to pass through the filter 118, 122 and compromise or contaminate the sterile environment of the bladder.

To perform the filter integrity test using a pressure degradation test procedure, the test head engages the inlet of the filter 118, 122 and applies an air pressure of a predetermined value to the inlet 65 and filter membrane. In one example, the predetermined value is the pressure where gas cannot permeate the membrane of an acceptable filter. A pressure sensor, or other method of measuring the integrity of the filter, is located within the test head and measures the pressure decay or diffusion rate through the filter membrane. The results from the integrity test are assessed to determine the quality of the filter 118, 122, and therefore the quality of the solution of the filled product bags 26. If the pressure sensor measures a decay or an unexpected rate of decay, then the filter 118, 122 fails the test.

Alternatively, in a bubble point test, the test head gradually increases the pressure applied to the filter 118, 122, and the increase in pressure is measured in parallel with the diffusion rate of the gas through the filter media. Any disproportionate increase in diffusion rate in relation to the applied pressure may indicate a hole or other structural flaw in the filter membrane, and the filter 118, 122 would fail the integrity test.

In addition to filter integrity test for the filters, a vacuum leak test is performed on every used cartridge. The used cartridge is placed inside a chamber which is sealed before applying a vacuum to the chamber. The time required to generate a certain level of vacuum is measured. In case if the time required is greater than a pre-validated time or if the required validated vacuum pressure is not able to be reached, the cartridge is deemed to have failed the vacuum test. The used cartridge 22 is put into a chamber which is sealed. The chamber is connected to a vacuum level sensor and a vacuum pump, and a vacuum is applied (i.e., a vacuum is pulled at a validated rate). If a desired level of vacuum is not reached in a pre-validated time, the cartridge 22 is considered to have failed the leak test.

Based on the results of the filter integrity test and the cartridge vacuum test, a determination that the solution of the filled product bag 26 is either sterile or has the potential of being compromised may be made with a high degree of certainty. Even if one filter 118, 122 of the filter assembly 34 fails the filter integrity test, there is a high chance that the solution in the bag 26 is still sterile as both filters 118, 122 of the filter assembly 34 would have to fail to compromise the solution. The filter integrity test performed in a filter integrity test machine and the vacuum test described above are not limited to those methods described herein, and may include different acceptable tests designed to assess the quality and performance of the filters 118, 122 and cartridge.

Figure 23:
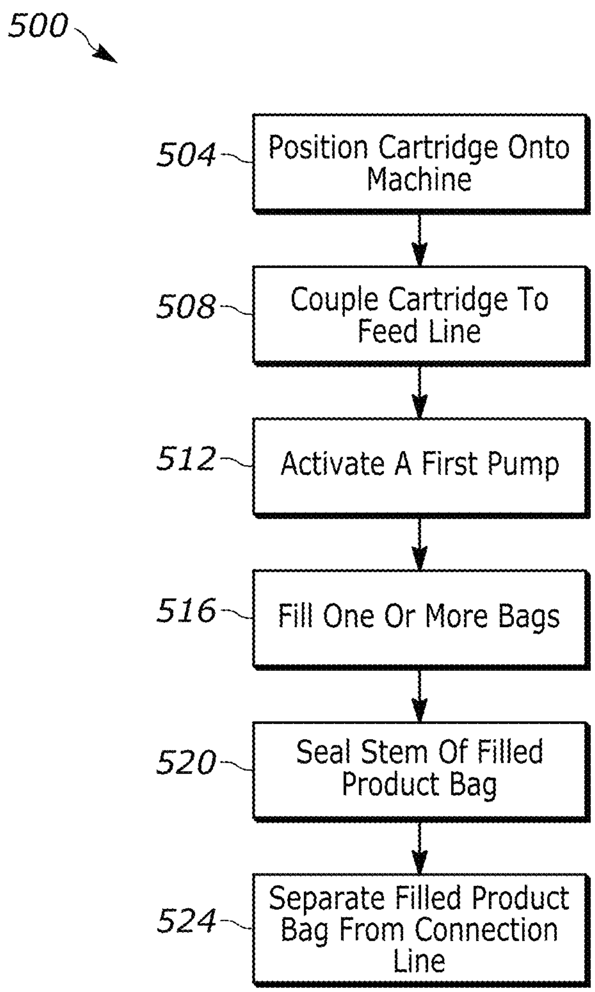
FIG. 23 is a flow diagram of a first exemplary method of filling a plurality of containers with sterile solution in accordance with the teachings of the present disclosure.

Turning now to FIG. 23, a first exemplary method 500 of filling a plurality of product bags with sterile solution is generally described. The method 500 may be performed with or without the machine 400 and with the same, similar, or different cartridge 22, 222 described herein.

The method 500 begins with a step 504 of positioning the cartridge 22 onto a filling machine, such as the filling machine 400 of FIGS. 18A-18D. While the following method is explained with reference to the first exemplary cartridge of FIGS. 2-3, the second exemplary cartridge 222 of FIGS. 6A-6C may be used as well in the method 500. A first, unused and gamma-sterilized cartridge 22 is loaded onto a gantry system 416, or other holding mechanism, of the machine 400. During this step 504, the peristaltic tubing 114 of the connection line 46 of the cartridge 22 is coupled the second pump 44, and the reservoir 38 and filter assembly 34 are loaded to the machine 400 such that the reservoir 38 is at least partially disposed above the grid 56 and engaged with the load cell 412. Next, the cartridge 22 is coupled to the feed line 18 in step 508.

A step 512 of activating the first pump 42 of the system 10 of FIG. 1 initiates the filling cycle to fill a plurality of bags 26 of the cartridge 22 with filtered solution. By activating the first pump 42, the feed line 18 is purged of air and vented through the vent 164 while the isolation valve 165 is in the closed position. Subsequently, solution is pumped from the mix tank 14, through the feed line 18, the filter assembly 34, and the connection line 46 of the cartridge 22. This step also includes filling the reservoir 38 with a desired amount of sterile solution before filling the remainder of the cartridge 22 with solution. The reservoir 38 is coupled to the connection line 46, disposed upstream from the plurality of bags 26, and disposed downstream from the filter assembly 34. In step 516, the solution from the reservoir 38 is used to at least partially fill one or more bladders 52 of the plurality of bags 26 of the cartridge 22 by activating the second pump 44. The second pump 44 is disposed downstream from the reservoir 38 and upstream from the plurality of bags 26 coupled to the connection line 46. The second pump 44 runs to first purge any air trapped in the connection line 46, and then to fill each of the plurality of bags 26, one at a time, with sterile solution.

In step 520, the method 500 includes sealing the stem 54 of each of the at least partially filled product bags 26 at a location between the connection line 46 and the bladder 52, thereby creating one or more at least partially filled and sealed product bag 26. Finally, each bag 26 is separated from the connection line 46 in step 524. As previously described, the seal and cut assembly 404 of the machine 400 may automatically seal and cut each stem 54 of the product bags 26 after each bag 26 is filled with solution. In another example, however, the stems 54 of each bag 26 may be sealed and cut manually. Finally, after separating each of the at least partially filled and sealed product bags 26 from the connection line 46 in step 524, the second pump 44 is reversed to recapture any unused solution from the cartridge 22.

The system 10, machine 400, and methods 500, 600, and cartridges 22, 222, 422, 822 disclosed herein provide considerable advantages for producing sterile solution-filled containers. The machine 400 is modular, portable, and self-containing, allowing customization of a filling system to meet a particular facility's specifications or market demand. One exemplary machine 400 has a footprint of approximately 6'×7'. Additionally, the methods 500 and 600 described herein provide sterile solution bags 26 without using a sterilizing autoclave and/or expensive sterilization equipment required to sterilize the working environment and eliminate the risk of formulation degradation due to heat exposure. Because the system 10 and machine 400 do not need to be decontaminated or cleaned to the extent other systems require (i.e., down time), the system 10 and machine 400 are available 24 hours a day, seven days a week. Further, the self-contained and fully-automated machine 400 reduces the sterilization procedures necessary to be performed in terminal sterilization and aseptic filling processes, thereby resulting in fewer operator interventions. In one example, where a cartridge 22 includes 360 bags, an operator may only be required to load a cartridge every 15-30 minutes or for every 360 bags filled.

The exemplary cartridges 22, 222 of the disclosed system 10 also allow for greater production and may be customized according to a particular need. Each filling cycle includes processing multiple bags 26 in a single run. In one example, the cartridge 22 includes 90 bags 26 and the second exemplary cartridge 222 includes 180 bags 226. In fact, the number of bags 26, 226 per cartridge 22, 222 may vary depending on the requirements of the system 10. Further, multiple cartridges 22, 222 may be connected together using aseptic connectors, such as the cartridge connector 50, to increase the number of units processed before filter change is required.

The configuration of the pre-gamma-sterilized cartridges 22, 222 disclosed herein also reduces risk of contamination. The system 10 is entirely closed because the only connection between the solution source (i.e., the mix tank 14 and the feed line 18) and the cartridge 22, 222 is at the cartridge connector 50. Once the solution passes through the filter assembly 34, the sterile solution is never exposed to the environment before flowing into the product bags 26, 226 thereby producing a product bag 26, 226 filled with fluid that has been subject to terminal sterilization filtration. Moreover, the stem 54 is sealed and cut after filling such that no environmental exposure of the fluid can take place. In the case the sterilizing filters 118, 122 are determined to be compromised, the bags 26, 226 containing fluid from that filter would be contained and discarded without contaminating the processing equipment of the machine or other product bags being processed.

In addition to the disclosed cartridge 22, the filter assembly 34 also reduces risk of contamination and improves product safety. The filter assembly 34 has a high filtration capacity by including two filters 118, 122 disposed in series. This dual-filter configuration provides a built-in filter contingency in rare chance that one of the filters 118, 122 fails during the filling cycle. The filter assembly 34, which may be used to filter 360 individual bags 26 of solution (i.e., dual cartridge of 180 bags per grid 56), reduces overall costs of the system 10 because more bags 26 are filled per filter 118, 122. Additionally, because there is a significantly decreased chance of both filters 118, 122 failing, less bags 26 are discarded over time. Further, there are significantly fewer filter changes per batch resulting in fewer filter integrity tests. For example, instead of testing the filter for each bag (e.g., when there is a 1:1 ratio of filter to bag), one filter is tested for an entire batch of bags, which may be 360 bags.

In another aspect of the cartridge 22, the reservoir 38 serves various and important roles that increase efficiency and accuracy of the filling system 10. In comparison to the filling time required in other terminal sterilization methods, the time for filling bags 26 of the system 10 disclosed herein is reduced significantly because solution is drawn directly from the reservoir 38 rather than from the filter assembly 34. By drawing from the bag 38, the filling cycle increases in efficiency and reduces strain typically placed on a filter assembly. This ensures that filling can be carried out at the maximum possible speed without increasing the pressure drop across the filter assembly 34 and thereby protecting the integrity of the filters 118, 122. The reservoir 38 also helps improve fill accuracy by removing the inherent variability introduced by the filter during its use cycle (i.e., as filter pores progressively clog up, the flow rate through the filter starts to change thereby negatively impacting fill accuracy).

Accuracy is also increased because the reservoir 38 is disposed on the load cell 412, which monitors the exact amount of solution disposed in the reservoir 38 at any time during the fill cycle. The system 10 does not have to account for a required amount of headspace in each given product bag 26 when filling each product bag 26 with solution because the trapped air in the connection line 46, which is typically pushed into the product bag 26, is initially purged and pushed into the reservoir 38 before the bags 26 are filled. This increases filling accuracy because only the amount of solution, rather than an additional estimated headspace created from the trapped air in the stem and/or connection line, needs to be measured and monitored.

Additionally, the reservoir 38 improves the sustainability of the filling system 10 by recovering any unused sterilized solution of each filling cycle. Initially, the reservoir 38 serves as a volume that receives solution required to wet the filter assembly 34, which would otherwise be discarded and/or wasted. Primarily, the reservoir 38 serves to minimize waste of the system 10 by receiving any unused solution (i.e., not delivered to a product bag 26) from the distribution grid 56. After all the solution is pulled back into the reservoir 38, the contents of the reservoir 38 are returned to the mix tank 14 safely and without any contamination risk. This reduces solution waste and controls environmental contamination in a simple and safe way. Finally, the amount of solution used for filling the plurality of bags 26 is monitored closely for more precise delivery by mounting the reservoir 38 on the load cell 412. Towards the end of the bag fill phase, the control system 402 of the machine 400 actively manages the amount of solution in the reservoir 38 to ensure that reservoir 38 is almost empty when the cycle ends.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. All methods described herein can be performed in any suitable order unless otherwise indicated herein or otherwise clearly contradicted by context. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

What is claimed:

1. A method of assembly for producing sterile solution-filled containers with a filling machine, the method comprising:

forming a solution distribution grid by:

coupling a first plurality of containers, each having a volume, to a first line via stems connected to the volumes;

coupling a second plurality of containers, each having a volume, to a second line via stems connected to the volumes;

coupling first ends of the first line and the second line to an inlet line to form an inlet manifold;

coupling second ends of the first line and the second line to an outlet line to form an outlet manifold; and coupling a connector upstream of the inlet line.

2. The method of claim 1, further comprising fluidly coupling a filter assembly to the inlet line via the connector.

3. The method of claim 2, wherein fluidly coupling the filter assembly to the inlet line via the connection comprises fluidly coupling a first filter and a second filter arranged in series to the inlet line via the connection.

4. The method of claim 2, further comprising fluidly coupling sample bags to each filter in the filter assembly, the sample bags configured to receive purged air and solution samples.

5. The method of claim 2, further comprising coupling a pump to move fluid into the inlet line and through the solution distribution grid.

6. The method of claim 5, further comprising fluidly coupling a reservoir between the pump and the filter assembly.

7. The method of claim 6, further comprising fluidly coupling the outlet line of the solution distribution grid to an inlet port of the reservoir.

8. The method of claim 7, further comprising fluidly coupling the inlet line of the solution distribution grid to an outlet port of the reservoir.

9. The method of claim 8, wherein the fill manifold of each of the first and second rows includes one or more ports corresponding to the one or more containers of each of the first and second rows, each port of the one or more ports in fluid communication with one stem of the one or more containers.

10. The method of claim 1, further comprising fluidly coupling a reservoir upstream of the solution distribution grid, the reservoir including a volume, a first port, and a second port.

11. The method of claim 10, further comprising fluidly coupling the outlet line of the solution distribution grid to the first port of the reservoir.

12. The method of claim 11, further comprising fluidly coupling the inlet line of the solution distribution grid to the second port of the reservoir.

13. The method of claim 11, wherein the solution distribution grid includes at least one rigid portion connected to at least one flexible portion.

14. The method of claim 1, wherein the first and second ends of the first and second lines are flexible and at least one of the inlet line or the outline line are rigid.

15. The method of claim 1, wherein the plurality of containers of the first and second lines comprise a plurality of product bags, and wherein the volumes are bladders.

16. The method of claim 1, wherein the plurality of containers of the first and second lines comprise a plurality of vials.

17. The method of claim 1, wherein the plurality of containers of the first and second lines comprise a plurality of syringes.

* * * * *